United States Patent
Li et al.

(10) Patent No.: US 11,778,599 B2
(45) Date of Patent: Oct. 3, 2023

(54) METHOD AND APPARATUS OF HANDLING TIME GAP FOR SIDELINK HYBRID AUTOMATIC REQUEST (HARQ) IN NETWORK SCHEDULING MODE IN A WIRELESS COMMUNICATION SYSTEM

(71) Applicant: ASUSTek Computer Inc., Taipei (TW)

(72) Inventors: Ming-Che Li, Taipei (TW); Chun-Wei Huang, Taipei (TW); Li-Chih Tseng, Taipei (TW)

(73) Assignee: ASUSTek Computer Inc., Taipei (TW)

( * ) Notice: Subject to any disclaimer, the term of this patent is extended or adjusted under 35 U.S.C. 154(b) by 64 days.

(21) Appl. No.: 17/549,848

(22) Filed: Dec. 13, 2021

(65) Prior Publication Data

US 2022/0104197 A1 Mar. 31, 2022

Related U.S. Application Data

(63) Continuation of application No. 17/224,872, filed on Apr. 7, 2021, now Pat. No. 11,234,237.
(Continued)

(51) Int. Cl.
*H04W 72/0446* (2023.01)
*H04W 76/14* (2018.01)
*H04L 5/00* (2006.01)

(52) U.S. Cl.
CPC ....... *H04W 72/0446* (2013.01); *H04L 5/0055* (2013.01); *H04L 5/0098* (2013.01); *H04W 76/14* (2018.02)

(58) Field of Classification Search
CPC ... H04L 1/1812; H04L 1/1854; H04L 1/1887; H04L 1/1896; H04L 5/0055;
(Continued)

(56) References Cited

U.S. PATENT DOCUMENTS

2017/0257876 A1* 9/2017 Loehr ............... H04W 28/0278
2021/0136781 A1* 5/2021 Hosseini ............... H04W 72/23

FOREIGN PATENT DOCUMENTS

EP 3206452 A1 * 8/2017 ............ H04W 72/10
JP 2020025362 A 2/2020
(Continued)

OTHER PUBLICATIONS

3GPP TS 38.331 v16.0.0, NR; Radio Resource Control (RRC) protocol specification, Date of Publication on 3GPP server (Apr. 6, 2020), 834 pages.
(Continued)

*Primary Examiner* — Thomas R Cairns
(74) *Attorney, Agent, or Firm* — Skaar Ulbrich Macari, P.A.

(57) ABSTRACT

A method and apparatus such as a device to perform sidelink communication including receiving a sidelink grant from a network node, wherein the sidelink grant schedules or assigns multiple sidelink resources, generating a data packet comprising or multiplexing sidelink data from Sidelink (SL) logical channel(s) with SL Hybrid Automatic Request (HARQ) feedback enabled, performing two sidelink transmissions for the data packet on two adjacent, neighbor, or consecutive sidelink resources among the multiple sidelink resources if a time gap of the two adjacent, neighbor, or consecutive sidelink resources is larger than or equal to a minimum time gap, and the device being allowed to drop, skip, or cancel a sidelink transmission on one sidelink resource of the two adjacent, neighbor, or consecutive sidelink resources among the multiple sidelink resources if the time gap of the two adjacent, neighbor, or consecutive sidelink resources is less than a minimum time gap.

18 Claims, 10 Drawing Sheets

Related U.S. Application Data

(60) Provisional application No. 63/035,354, filed on Jun. 5, 2020, provisional application No. 63/007,638, filed on Apr. 9, 2020.

(58) Field of Classification Search
CPC ............ H04L 5/0098; H04W 72/0446; H04W 72/1263; H04W 72/20; H04W 72/23; H04W 72/53; H04W 76/14; H04W 76/15; H04W 92/18
See application file for complete search history.

(56) References Cited

FOREIGN PATENT DOCUMENTS

| WO | WO-2016117940 A1 * | 7/2016 | ............ H04W 72/02 |
| WO | WO-2017137231 A1 * | 8/2017 | ............ H04W 72/10 |
| WO | WO-2021066407 A1 * | 4/2021 | ............... H04L 1/08 |

OTHER PUBLICATIONS

Intel Corporation, R1-2000731, Remaining opens of resource allocation mode-2 for NR V2X design, 3GPP TSG RAN WG1 #100, Date of Publication on server (Feb. 15, 2020), 16 pages.

RP-200431, Status Report to TSG, 3GPP TSG RAN #87E, Date of Publication on 3GPP server (Mar. 13, 2020), 25 pages.

Office Action to the corresponding Korean Patent Application rendered by the Korean Intellectual Property Office (KIPO) on Oct. 28, 2022, 6 pages (including English translation).

* cited by examiner

| TrCH | Physical Channel |
|---|---|
| SL-SCH | PSSCH |
| SL-BCH | PSBCH |

FIG. 5 (PRIOR ART)

| Control information | Physical Channel |
|---|---|
| $1^{st}$-stage SCI | PSCCH |
| $2^{nd}$-stage SCI | PSSCH |
| SFCI | PSFCH |

FIG. 6 (PRIOR ART)

| DCI format | Usage |
|---|---|
| 0_0 | Scheduling of PUSCH in one cell |
| 0_1 | Scheduling of one or multiple PUSCH in one cell, or indicating downlink feedback information for configured grant PUSCH (CG-DFI) |
| 0_2 | Scheduling of PUSCH in one cell |
| 1_0 | Scheduling of PDSCH in one cell |
| 1_1 | Scheduling of PDSCH in one cell, and/or triggering one shot HARQ-ACK codebook feedback |
| 1_2 | Scheduling of PDSCH in one cell |
|  |  |
|  |  |
|  |  |
|  |  |
|  |  |
|  |  |
| 3_0 | Scheduling of NR sidelink in one cell |
| 3_1 | Scheduling of LTE sidelink in one cell |

FIG. 7 (PRIOR ART)

METHOD AND APPARATUS OF HANDLING TIME GAP FOR SIDELINK HYBRID AUTOMATIC REQUEST (HARQ) IN NETWORK SCHEDULING MODE IN A WIRELESS COMMUNICATION SYSTEM

CROSS-REFERENCE TO RELATED APPLICATIONS

The present application is a continuation of U.S. patent application Ser. No. 17/224,872, filed Apr. 7, 2021, which claims priority to and the benefit of U.S. Provisional Patent Application Ser. No. 63/007,638, filed Apr. 9, 2020, and U.S. Provisional Patent Application Ser. No. 63/035,354, filed Jun. 5, 2020; with the entire disclosure of each referenced application fully incorporated herein by reference.

FIELD

This disclosure generally relates to wireless communication networks, and more particularly, to a method and apparatus handling time gap for sidelink Hybrid Automatic Request (HARQ) in network scheduling mode in a wireless communication system.

BACKGROUND

With the rapid rise in demand for communication of large amounts of data to and from mobile communication devices, traditional mobile voice communication networks are evolving into networks that communicate with Internet Protocol (IP) data packets. Such IP data packet communication can provide users of mobile communication devices with voice over IP, multimedia, multicast and on-demand communication services.

An exemplary network structure is an Evolved Universal Terrestrial Radio Access Network (E-UTRAN). The E-UTRAN system can provide high data throughput in order to realize the above-noted voice over IP and multimedia services. A new radio technology for the next generation (e.g., 5G) is currently being discussed by the 3GPP standards organization. Accordingly, changes to the current body of 3GPP standard are currently being submitted and considered to evolve and finalize the 3GPP standard.

SUMMARY

A method and apparatus are disclosed from the perspective of a device to perform sidelink communication. In one embodiment, the method includes the device receiving a sidelink grant from a network node, wherein the sidelink grant schedules or assigns multiple sidelink resources. The method further includes the device generating a data packet comprising or multiplexing sidelink data from Sidelink (SL) logical channel(s) with SL Hybrid Automatic Request (HARD) feedback enabled. The method further includes performing two sidelink transmissions for the data packet on two adjacent, neighbor, or consecutive sidelink resources among the multiple sidelink resources if a time gap of the two adjacent, neighbor, or consecutive sidelink resources is larger than or equal to a minimum time gap. In addition, the method includes the device allowing to drop, skip, or cancel a sidelink transmission on one sidelink resource of the two adjacent, neighbor, or consecutive sidelink resources among the multiple sidelink resources if the time gap of the two adjacent, neighbor, or consecutive sidelink resources is less than a minimum time gap.

Furthermore, an alternative method and apparatus are disclosed from the perspective of a device to perform sidelink communication. In one embodiment, the method includes the device receiving a sidelink grant from a network node, wherein the sidelink grant schedules or assigns multiple sidelink resources. The method further includes the device generating a data packet comprising or multiplexing sidelink data from one or more Sidelink (SL) logical channel(s), wherein the one or more SL logical channel(s) is determined or selected at least based on time gap of any two adjacent sidelink resources among the multiple sidelink resources. In addition, the method includes the device performing one or more sidelink transmission(s) on one or more of the multiple sidelink resources, wherein the one or more sidelink transmission(s) delivers or comprises the data packet.

BRIEF DESCRIPTION OF THE DRAWINGS

FIG. 5 is a reproduction of Table 4.3-1 of 3GPP TS 38.212 V16.1.0.

FIG. 6 is a reproduction of Table 4.3-2 of 3GPP TS 38.212 V16.1.0.

FIG. 7 is a reproduction of Table 7.3.1-1 of 3GPP TS 38.212 V16.1.0.

DETAILED DESCRIPTION

The exemplary wireless communication systems and devices described below employ a wireless communication system, supporting a broadcast service. Wireless communication systems are widely deployed to provide various types of communication such as voice, data, and so on. These systems may be based on code division multiple access (CDMA), time division multiple access (TDMA), orthogonal frequency division multiple access (OFDMA), 3GPP LTE (Long Term Evolution) wireless access, 3GPP LTE-A or LTE-Advanced (Long Term Evolution Advanced), 3GPP2 UMB (Ultra Mobile Broadband), WiMax, 3GPP NR (New Radio), or some other modulation techniques.

In particular, the exemplary wireless communication systems devices described below may be designed to support one or more standards such as the standard offered by a consortium named "3rd Generation Partnership Project" referred to herein as 3GPP, including: TS 38.211 V16.1.0 (2020-03), "NR; Physical channels and modulation (Release 16)"; TS 38.212 V16.1.0 (2020-03), "NR; Multiplexing and channel coding (Release 16)"; TS 38.213 V16.1.0 (2020-03), "NR; Physical layer procedures for control (Release 16)"; TS 38.214 V16.1.0 (2020-03), "NR; Physical layer procedures for data (Release 16)"; TS 38.321 V16.0.0 (2020-03), "NR; Medium Access Control (MAC) protocol specification (Release 16)"; R1-1810051, "Final Report of 3GPP TSG RAN WG1 #94 V1.0.0 (Gothenburg, Sweden, 20-24 Aug. 2018)"; R1-1905921, "Final Report of 3GPP TSG RAN WG1 #96bis V1.0.0 (Xi'an, China, 8-12 Apr. 2019)"; R1-1907973, "Final Report of 3GPP TSG RAN WG1 #97 V1.0.0 (Reno, USA, 13-17 May 2019)"; R1-1909942, "Final Report of 3GPP TSG RAN WG1 #98 V1.0.0 (Prague, Czech Rep., 26-30 Aug. 2019)"; Draft Report of 3GPP TSG RAN WG1 #99 V1.0.0 (Reno, USA, 18-22 Nov. 2019); and Draft Report of 3GPP TSG RAN WG1 #100-e V0.2.0 (Online meeting, 18 Feb.-6 Mar. 2020). The standards and documents listed above are hereby expressly incorporated by reference in their entirety.

Figure 1:
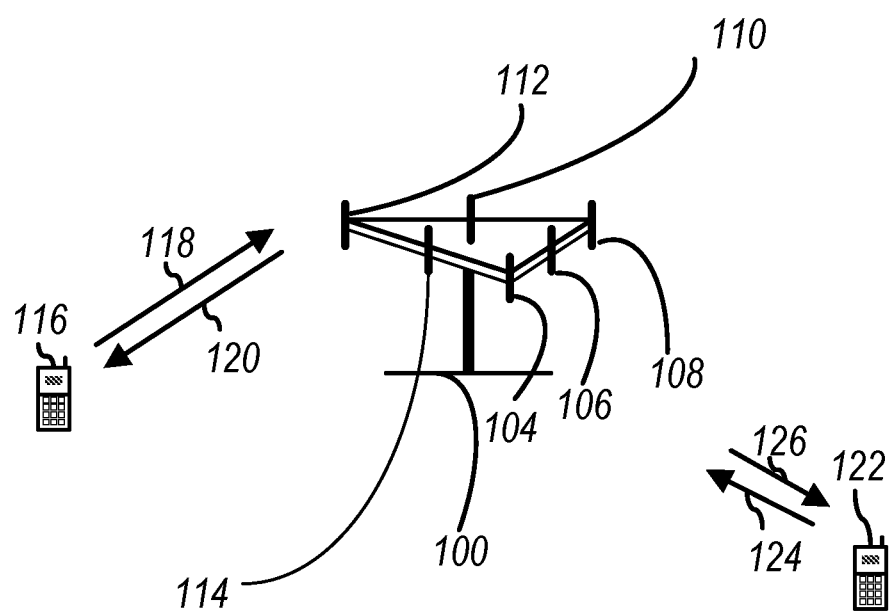
FIG. 1 shows a diagram of a wireless communication system according to one exemplary embodiment.

FIG. 1 shows a multiple access wireless communication system according to one embodiment of the invention. An access network 100 (AN) includes multiple antenna groups, one including 104 and 106, another including 108 and 110, and an additional including 112 and 114. In FIG. 1, only two antennas are shown for each antenna group, however, more or fewer antennas may be utilized for each antenna group. Access terminal 116 (AT) is in communication with antennas 112 and 114, where antennas 112 and 114 transmit information to access terminal 116 over forward link 120 and receive information from access terminal 116 over reverse link 118. Access terminal (AT) 122 is in communication with antennas 106 and 108, where antennas 106 and 108 transmit information to access terminal (AT) 122 over forward link 126 and receive information from access terminal (AT) 122 over reverse link 124. In a FDD system, communication links 118, 120, 124 and 126 may use different frequency for communication. For example, forward link 120 may use a different frequency then that used by reverse link 118.

Each group of antennas and/or the area in which they are designed to communicate is often referred to as a sector of the access network. In the embodiment, antenna groups each are designed to communicate to access terminals in a sector of the areas covered by access network 100.

In communication over forward links 120 and 126, the transmitting antennas of access network 100 may utilize beamforming in order to improve the signal-to-noise ratio of forward links for the different access terminals 116 and 122. Also, an access network using beamforming to transmit to access terminals scattered randomly through its coverage causes less interference to access terminals in neighboring cells than an access network transmitting through a single antenna to all its access terminals.

An access network (AN) may be a fixed station or base station used for communicating with the terminals and may also be referred to as an access point, a Node B, a base station, an enhanced base station, an evolved Node B (eNB), or some other terminology. An access terminal (AT) may also be called user equipment (UE), a wireless communication device, terminal, access terminal or some other terminology.

Figure 2:
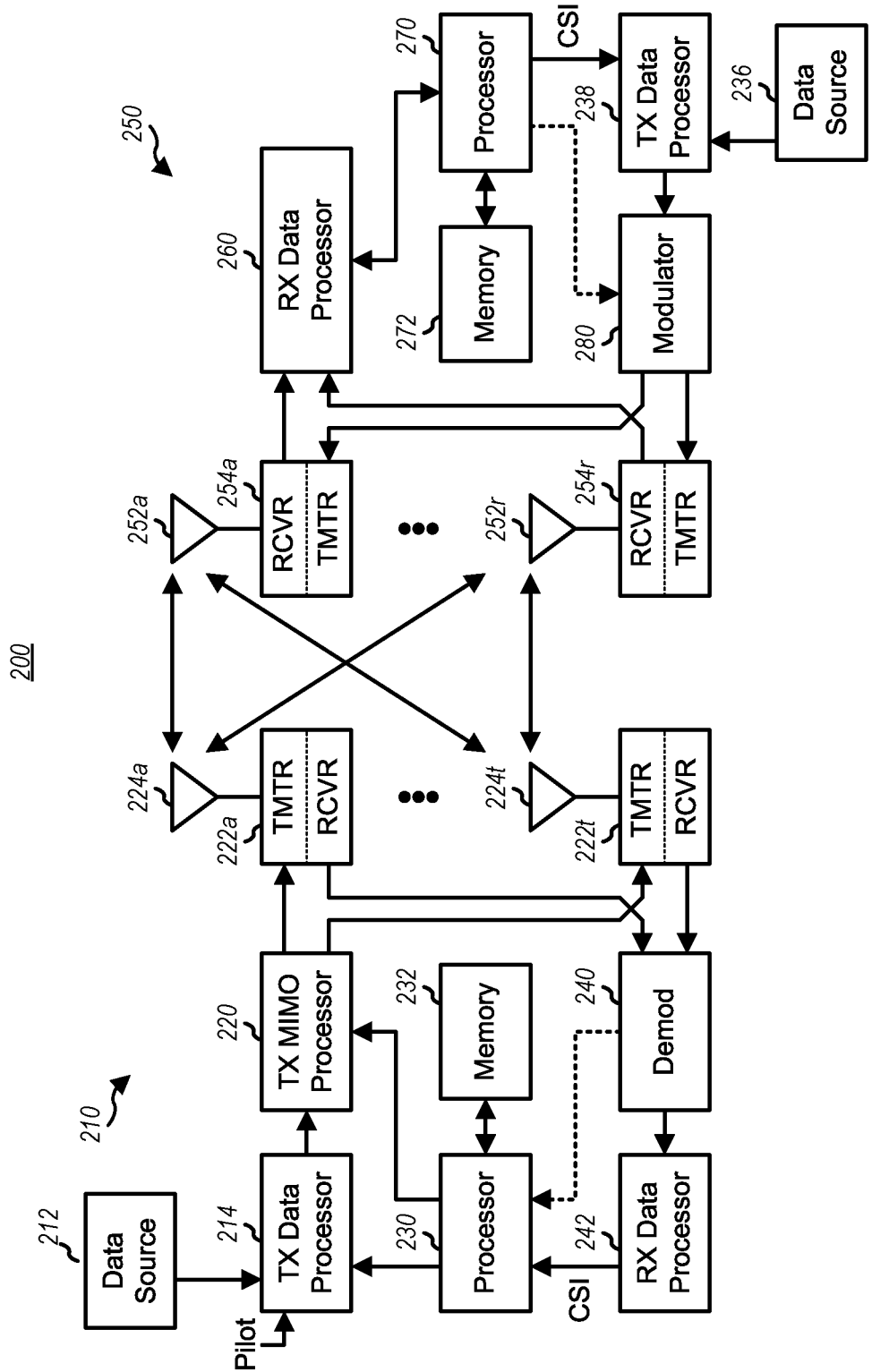
FIG. 2 is a block diagram of a transmitter system (also known as access network) and a receiver system (also known as user equipment or UE) according to one exemplary embodiment.

FIG. 2 is a simplified block diagram of an embodiment of a transmitter system 210 (also known as the access network) and a receiver system 250 (also known as access terminal (AT) or user equipment (UE)) in a MIMO system 200. At the transmitter system 210, traffic data for a number of data streams is provided from a data source 212 to a transmit (TX) data processor 214.

In one embodiment, each data stream is transmitted over a respective transmit antenna. TX data processor 214 formats, codes, and interleaves the traffic data for each data stream based on a particular coding scheme selected for that data stream to provide coded data.

The coded data for each data stream may be multiplexed with pilot data using OFDM techniques. The pilot data is typically a known data pattern that is processed in a known manner and may be used at the receiver system to estimate the channel response. The multiplexed pilot and coded data for each data stream is then modulated (i.e., symbol mapped) based on a particular modulation scheme (e.g., BPSK, QPSK, M-PSK, or M-QAM) selected for that data stream to provide modulation symbols. The data rate, coding, and modulation for each data stream may be determined by instructions performed by processor 230.

The modulation symbols for all data streams are then provided to a TX MIMO processor 220, which may further process the modulation symbols (e.g., for OFDM). TX MIMO processor 220 then provides $N_T$ modulation symbol streams to $N_T$ transmitters (TMTR) 222a through 222t. In certain embodiments, TX MIMO processor 220 applies beamforming weights to the symbols of the data streams and to the antenna from which the symbol is being transmitted.

Each transmitter 222 receives and processes a respective symbol stream to provide one or more analog signals, and further conditions (e.g., amplifies, filters, and upconverts) the analog signals to provide a modulated signal suitable for transmission over the MIMO channel. $N_T$ modulated signals from transmitters 222a through 222t are then transmitted from $N_T$ antennas 224a through 224t, respectively.

At receiver system 250, the transmitted modulated signals are received by $N_R$ antennas 252a through 252r and the received signal from each antenna 252 is provided to a respective receiver (RCVR) 254a through 254r. Each receiver 254 conditions (e.g., filters, amplifies, and downconverts) a respective received signal, digitizes the conditioned signal to provide samples, and further processes the samples to provide a corresponding "received" symbol stream.

An RX data processor 260 then receives and processes the $N_R$ received symbol streams from $N_R$ receivers 254 based on a particular receiver processing technique to provide $N_T$ "detected" symbol streams. The RX data processor 260 then demodulates, deinterleaves, and decodes each detected symbol stream to recover the traffic data for the data stream. The processing by RX data processor 260 is complementary to that performed by TX MIMO processor 220 and TX data processor 214 at transmitter system 210.

A processor 270 periodically determines which pre-coding matrix to use (discussed below). Processor 270 formulates a reverse link message comprising a matrix index portion and a rank value portion.

The reverse link message may comprise various types of information regarding the communication link and/or the received data stream. The reverse link message is then processed by a TX data processor 238, which also receives traffic data for a number of data streams from a data source 236, modulated by a modulator 280, conditioned by transmitters 254a through 254r, and transmitted back to transmitter system 210.

At transmitter system 210, the modulated signals from receiver system 250 are received by antennas 224, conditioned by receivers 222, demodulated by a demodulator 240, and processed by a RX data processor 242 to extract the reserve link message transmitted by the receiver system 250. Processor 230 then determines which pre-coding matrix to use for determining the beamforming weights then processes the extracted message.

Figure 3:
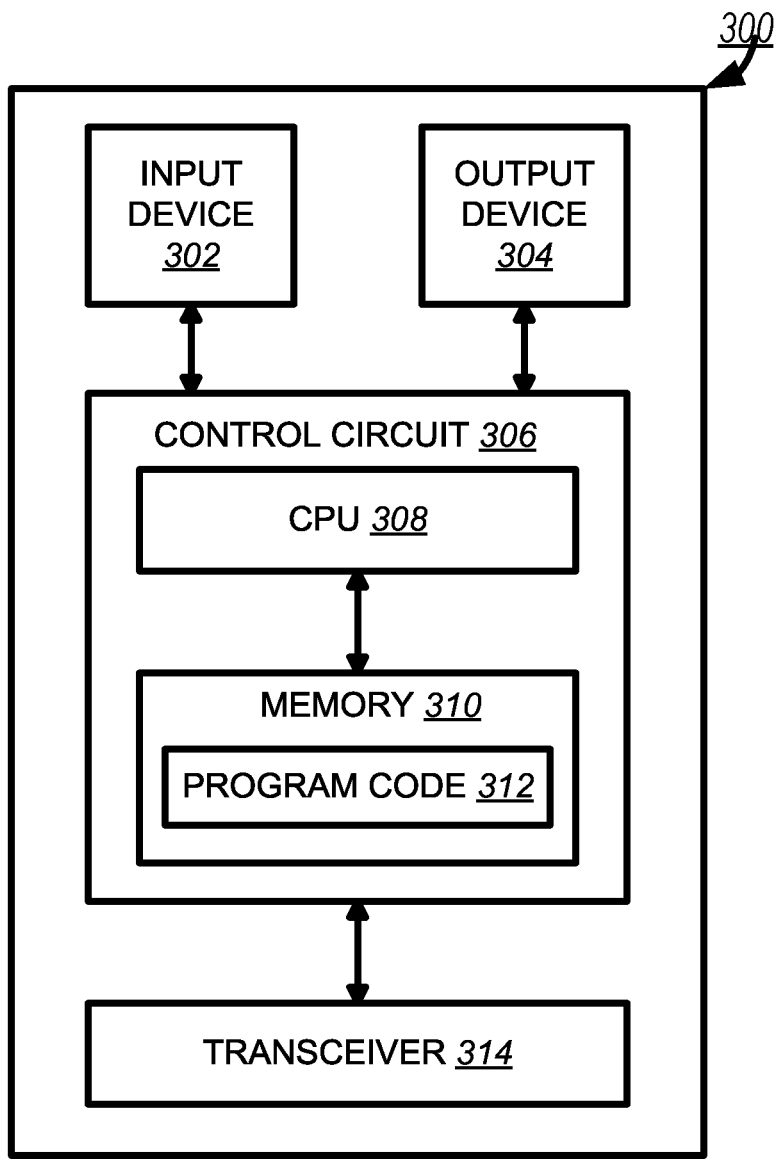
FIG. 3 is a functional block diagram of a communication system according to one exemplary embodiment.

Turning to FIG. 3, this figure shows an alternative simplified functional block diagram of a communication device according to one embodiment of the invention. As shown in FIG. 3, the communication device 300 in a wireless communication system can be utilized for realizing the UEs (or ATs) 116 and 122 in FIG. 1 or the base station (or AN) 100 in FIG. 1, and the wireless communications system is preferably the NR system. The communication device 300 may include an input device 302, an output device 304, a control circuit 306, a central processing unit (CPU) 308, a memory 310, a program code 312, and a transceiver 314. The control circuit 306 executes the program code 312 in the memory 310 through the CPU 308, thereby controlling an operation of the communications device 300. The communications device 300 can receive signals input by a user through the input device 302, such as a keyboard or keypad, and can output images and sounds through the output device 304, such as a monitor or speakers. The transceiver 314 is used to receive and transmit wireless signals, delivering received signals to the control circuit 306, and outputting signals generated by the control circuit 306 wirelessly. The communication device 300 in a wireless communication system can also be utilized for realizing the AN 100 in FIG. 1.

Figure 4:
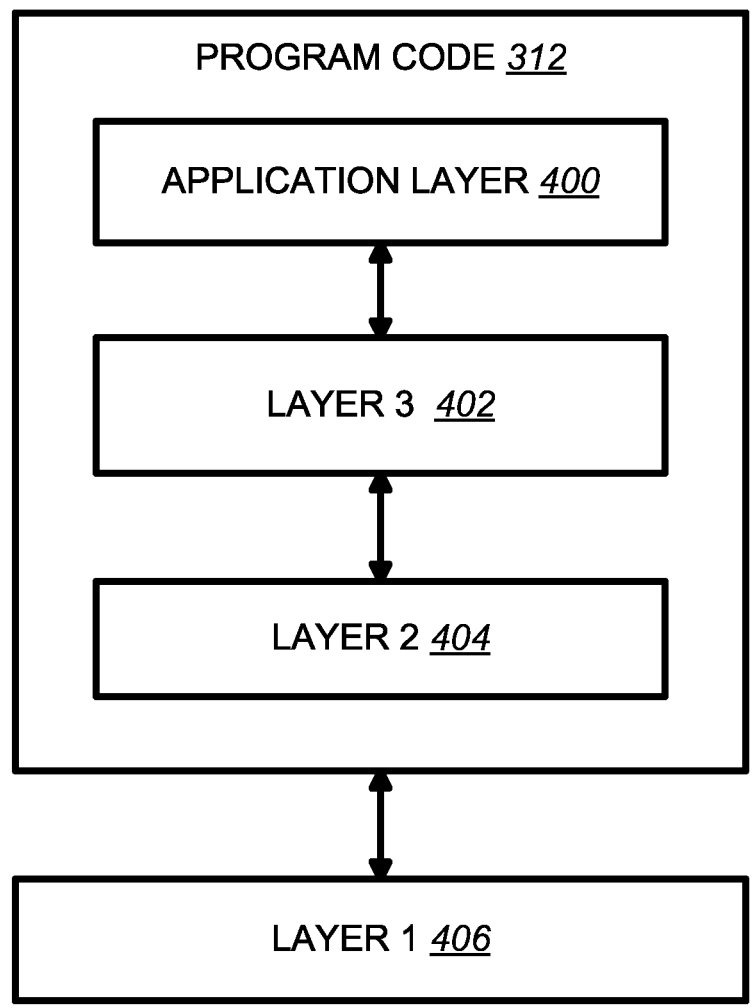
FIG. 4 is a functional block diagram of the program code of FIG. 3 according to one exemplary embodiment.

FIG. 4 is a simplified block diagram of the program code 312 shown in FIG. 3 in accordance with one embodiment of the invention. In this embodiment, the program code 312 includes an application layer 400, a Layer 3 portion 402, and a Layer 2 portion 404, and is coupled to a Layer 1 portion 406. The Layer 3 portion 402 generally performs radio resource control. The Layer 2 portion 404 generally performs link control. The Layer 1 portion 406 generally performs physical connections.

3GPP TS 38.211 V16.1.0 specifies generation for physical sidelink shared channel, physical sidelink control channel, and physical sidelink feedback channel in NR, as discussed below. In general, the physical sidelink shared channel, the physical sidelink control channel, and the physical sidelink feedback channel are for communication between devices, i.e. PC5 link or device-to-device link. The physical sidelink shared channel (PSSCH) delivers data/transport block for sidelink shared channel (SL-SCH). The physical sidelink control channel (PSCCH) delivers sidelink control information (SCI). The physical sidelink feedback channel (PSFCH) delivers sidelink HARQ-ACK.

8 Sidelink
8.1 Overview
8.1.1 Overview of Physical Channels

A sidelink physical channel corresponds to a set of resource elements carrying information originating from higher layers. The following sidelink physical channels are defined:
Physical Sidelink Shared Channel, PSSCH
Physical Sidelink Broadcast Channel, PSBCH
Physical Sidelink Control Channel, PSCCH
Physical Sidelink Feedback Channel, PSFCH 3GPP TS 38.212 V16.1.0 specifies downlink control information for scheduling of sidelink and sidelink control information in NR, as discussed below. The downlink control information is for communication between network node and UE, i.e. Uu link. The sidelink control information are for communication between UEs, i.e. PC5 link or sidelink.

4.3 Sidelink

Table 4.3-1 specifies the mapping of the sidelink transport channels to their corresponding physical channels. Table 4.3-2 specifies the mapping of the sidelink control information and sidelink feedback control information to their corresponding physical channels.

[Table 4.3-1 of 3GPP TS 38.212 V16.1.0 is reproduced as FIG. 5]
[Table 4.3-2 of 3GPP TS 38.212 V16.1.0 is reproduced as FIG. 6]
<Unchanged parts are omitted>

7.3.1 DCI formats

The DCI formats defined in table 7.3.1-1 are supported.
[Table 7.3.1-1 of 3GPP TS 38.212 V16.1.0, entitled "DCI formats", is reproduced as FIG. 7]
<Unchanged parts are omitted>

7.3.1.4 DCI formats for scheduling of sidelink
7.3.1.4.1 Format 3_0

DCI format 3_0 is used for scheduling of NR PSCCH and NR PSSCH in one cell.

The following information is transmitted by means of the DCI format 3_0 with CRC scrambled by SL-RNTI or SL-CS-RNTI:

Time gap—[x] bits determined by higher layer parameter sl-DCI-ToSL-Trans, as defined in clause x.x.x of [6, TS 38.214]

HARQ process ID—[x] bits as defined in clause 16.4 of [5, TS 38.213]

New data indicator—1 bit as defined in clause 16.4 of [5, TS 38.213]

Lowest index of the subchannel allocation to the initial transmission $-\lceil \log_2(N_{subchannel}^{SL}) \rceil$ bits as defined in clause x.x.x of [6, TS 38.214]

SCI format 0-1 fields according to clause 8.3.1.1:
Frequency resource assignment.
Time resource assignment.
PSFCH-to-HARQ feedback timing indicator—3 bits as defined in clause x.x.x of [6, TS 38.214].
PUCCH resource indicator—3 bits as defined in clause x.x.x of [6, TS 38.214].
Configuration index—0 bit if the UE is not configured to monitor DCI format 3_0 with CRC scrambled by SL-CS-RNTI; otherwise [x] bits as defined in clause x.x.x of [6, TS 38.214]. If the UE is configured to monitor DCI format 3_0 with CRC scrambled by SL-CS-RNTI, this field is reserved for DCI format 3_0 with CRC scrambled by SL-RNTI.

<Unchanged parts are omitted>

8.3 Sidelink control information on PSCCH

SCI carried on PSCCH is a $1^{st}$-stage SCI, which transports sidelink scheduling information.

8.3.1 $1^{st}$-stage SCI formats
[ . . . ]

8.3.1.1 SCI format 0-1

SCI format 0-1 is used for the scheduling of PSSCH and $2^{nd}$-stage-SCI on PSSCH The following information is transmitted by means of the SCI format 0-1:

Priority—3 bits as defined in clause x.x.x of [6, TS 38.214].

Frequency resource assignment $$-\left\lceil \log_2\left(\frac{N_{subChannel}^{SL}(N_{subChannel}^{SL}+1)}{2}\right) \right\rceil$$

bits when the value of the higher layer parameter sl-MaxNumPerReserve is configured to 2; otherwise $$\left\lceil \log_2\left(\frac{N_{subChannel}^{SL}(N_{subChannel}^{SL}+1)(2N_{subChannel}^{SL}+1)}{6}\right)\right\rceil$$

bits when the value of the higher layer parameter sl-MaxNumPerReserve is configured to 3, as defined in clause x.x.x of [6, TS 38.214].

Time resource assignment—5 bits when the value of the higher layer parameter sl-MaxNumPerReserve is configured to 2; otherwise 9 bits when the value of the higher layer parameter sl-MaxNumPerReserve is configured to 3, as defined in clause x.x.x of [6, TS 38.214].

Resource reservation period $-\lceil \log_2(N_{reservPeriod})\rceil$ bits as defined in clause x.x.x of [6, TS 38.214], if higher parameter sl-MultiReserveResource is configured; 0 bit otherwise.

DMRS pattern—[x] bits as defined in clause 8.4.1.1.2 of [4, TS 38.211], if more than one DMRS patterns are configured by higher layer parameter sl-PSSCH-DMRS-TimePattern; 0 bit otherwise.

$2^{nd}$-stage SCI format—[x] bits as defined in clause x.x.x of [6, TS 38.214].

Beta_offset indicator—[2] bits as provided by higher layer parameter sl-BetaOffsets2ndSCI.

Number of DMRS port—1 bit as defined in Table 8.3.1.1-1.

Modulation and coding scheme—5 bits as defined in clause 8.1.3 of [6, TS 38.214].

Reserved—[2-4] bits as determined by higher layer parameter sl-NumReservedBits, with value set to zero.

8.4 Sidelink control information on PSSCH

SCI carried on PSSCH is a $2^{nd}$-stage SCI, which transports sidelink scheduling information.

8.4.1 $2^{nd}$-stage SCI formats

[ . . . ]

8.4.1.1 SCI format 0-2

SCI format 0-2 is used for the decoding of PSSCH.

The following information is transmitted by means of the SCI format 0-2:

HARQ Process ID—[x] bits as defined in clause 16.4 of [5, TS 38.213].

New data indicator—1 bit as defined in clause 16.4 of [5, TS 38.213].

Redundancy version—2 bits as defined in clause x.x.x of [6, TS 38.214].

Source ID—8 bits as defined in clause x.x.x of [6, TS 38.214].

Destination ID—16 bits as defined in clause x.x.x of [6, TS 38.214].

CSI request—1 bit as defined in clause 8.2.1 of [6, TS 38.214].

If the $2^{nd}$-stage SCI format field in the corresponding SCI format 0-1 indicates type 1 groupcast as defined in clause x.x.x of [6, TS 38.214], the following fields are present:

Zone ID—12 bits as defined in clause x.x.x of [9, TS 38.331].

Communication range requirement—4 bits as defined in clause x.x.x of [9, TS 38.331] [ . . . ]

8.4.5 Multiplexing of coded $2^{nd}$-stage SCI bits to PSSCH

The coded $2^{nd}$-stage SCI bits are multiplexed onto PSSCH according to the procedures in Clause 8.2.1.

3GPP TS 38.213 V16.1.0 specifies the UE procedure for reporting HARQ-ACK on sidelink and reporting HARQ-ACK on PUCCH in NR.

16 UE Procedures for Sidelink

A UE is provided by locationAndBandwidth-SL a BWP for SL transmissions (SL BWP) with numerology and resource grid determined as described in [4, TS38.211]. For a resource pool within the SL BWP, the UE is provided by numSubchannel a number of sub-channels where each sub-channel includes a number of contiguous RBs provided by subchannelsize. The first RB of the first sub-channel in the SL BWP is indicated by startRB-Subchannel. Available slots for a resource pool are provided by timeresourcepool and occur with a periodicity provided by 'periodResourcePool'. For an available slot without S-SS/PSBCH blocks, SL transmissions can start from a first symbol indicated by startSLsymbols and be within a number of consecutive symbols indicated by lengthSLsymbols. For an available slot with S-SS/PSBCH blocks, the first symbol and the number of consecutive symbols is predetermined.

The UE expects to use a same numerology in the SL BWP and in an active UL BWP in a same carrier of a same cell. If the active UL BWP numerology is different than the SL BWP numerology, the SL BWP is deactivated.

A UE transmitting using a Mode-1 grant uses the corresponding fields in SCI to reserve the next resource(s) allocated by the same grant.

[ . . . ]

16.3 UE procedure for reporting HARQ-ACK on sidelink

A UE can be indicated by an SCI format scheduling a PSSCH reception, in one or more sub-channels from a number of $N_{subch}^{PSSCH}$ sub-channels, to transmit a PSFCH with HARQ-ACK information in response to the PSSCH reception. The UE provides HARQ-ACK information that includes ACK or NACK, or only NACK.

A UE can be provided, by periodPSFCHresource, a number of slots in a resource pool for a period of PSFCH transmission occasion resources. If the number is zero, PSFCH transmissions from the UE in the resource pool are disabled.

A UE may be indicated by higher layers to not transmit a PSFCH in response to a PSSCH reception [11, TS 38.321].

If a UE receives a PSSCH in a resource pool and a ZYX field in a SCI format 0_2 scheduling the PSSCH reception indicates to the UE to report HARQ-ACK information for the PSSCH reception [5, TS 38.212], the UE provides the HARQ-ACK information in a PSFCH transmission in the resource pool. The UE transmits the PSFCH in a first slot that includes PSFCH resources and is at least a number of slots, provided by MinTimeGapPSFCH, of the resource pool after a last slot of the PSSCH reception.

A UE is provided by rbSetPSFCH a set of $M_{PRB,set}^{PSFCH}$ PRBs in a resource pool for PSFCH transmission in a PRB of the resource pool. For a number of $N_{subch}$ sub-channels for the resource pool, provided by numSubchannel, and a number of $N_{PSSCH}^{PSFCH}$ PSSCH slots associated with a PSFCH slot, provided by periodPSFCHresource, the UE allocates the $[(i+j \cdot N_{PSSCH}^{PSFCH}) \cdot M_{subch,slot}^{PSFCH}$, $(i+1+j \cdot N_{PSSCH}^{PSFCH}) \cdot M_{subch,slot}^{PSFCH}-1]$ PRBs from the $M_{PRB,set}^{PSFCH}$ PRBs to slot i and sub channel j, where $M_{subch,slot}^{PSFCH} = M_{PRB,set}^{PSFCH}/(N_{subch} \cdot N_{PSSCH}^{PSFCH})$, $0 \le i < N_{PSSCH}^{PSFCH}$, $0 \le j < N_{subch}$, and the allocation starts in an ascending order of i and continues in an ascending order of j. The UE expects that $M_{PRB,set}^{PSFCH}$ is a multiple of $N_{subch} \cdot N_{PSSCH}^{PSFCH}$.

A UE determines a number of PSFCH resources available for multiplexing HARQ-ACK information in a PSFCH transmission as $R_{PRB,CS}^{PSFCH} = N_{type}^{PSFCH} \cdot M_{subch,slot}^{PSFCH} \cdot N_{CS}^{PSFCH}$ where $N_{CS}^{PSFCH}$ is a number of cyclic shift pairs for the resource pool and, based on an indication by higher layers, $N_{type}^{PSFCH}=1$ and the $M_{subch,slot}^{PSFCH}$ PRBs are associated with the starting sub-channel of the corresponding PSSCH $N_{type}^{PSFCH}=N_{subch}^{PSSCH}$ and the $N_{subch}^{PSSCH} \cdot M_{subch,slot}^{PSFCH}$ PRBs are associated with one or more sub-channels from the $N_{subch}^{PSSCH}$ sub-channels of the corresponding PSSCH The PSFCH resources are first indexed according to an ascending order of the PRB index, from the $N_{type}^{PSFCH} \cdot M_{subch,slot}^{PSFCH}$ PRBs, and then according to an ascending order of the cyclic shift pair index from the $N_{CS}^{PSFCH}$ cyclic shift pairs.

A UE determines an index of a PSFCH resource for a PSFCH transmission in response to a PSSCH reception, as $(P_{ID}+M_{ID}) \bmod R_{PRB,CS}^{PSFCH}$ where $P_{ID}$ is a physical layer source ID provided by SCI format 0_2 [5, TS 38.212] scheduling the PSSCH reception, $M_{ID}$ is zero or $M_{ID}$ is the identity of the UE receiving the PSSCH as indicated by higher layers.

16.4 UE procedure for transmitting PSCCH

A UE can be provided a number of symbols in a resource pool, by timeResourcePSCCH, starting from a second symbol that is available for SL transmissions in a slot, and a number of PRBs in the resource pool, by frequencyResourcePSCCH, for a PSCCH transmission with a SCI format 0_1.

A UE that transmits a PSCCH with SCI format 0_1 using sidelink resource allocation mode 1 [6, TS38.214]
  sets a value of a HARQ process ID field as indicated by higher layers
  for an initial transmission of a TB that is scheduled by a DCI format 3_0 with CRC scrambled by SL-RNTI, the UE
    toggles the NDI field value in SCI format 0_1, if the NDI field value in DCI format 3_0 is toggled
    does not toggle the NDI field value in SCI format 0_1, if the NDI field value in DCI format 3_0 is not toggled
  for subsequent transmissions of the TB that are scheduled by the DCI format 3_0 with CRC scrambled by SL-RNTI, the UE does not toggle the NDI field value in SCI format 0_1.

3GPP TS 38.214 V16.1.0 specifies the UE procedure for sidelink shared channel in NR, as discussed below. Sidelink resource allocation mode 1 or sidelink resource allocation mode 2 is utilized for acquiring sidelink resource(s) for sidelink shared channel.

8 Physical sidelink shared channel related procedures

A UE can be configured by higher layers with one or more sidelink resource pools. A sidelink resource pool can be for transmission of PSSCH, as described in Clause 8.1, or for reception of PSSCH, as described in Clause 8.3 and can be associated with either sidelink resource allocation mode 1 or sidelink resource allocation mode 2.

In the frequency domain, a sidelink resource pool consists of numSubchannel contiguous sub-channels. A sub-channel consists of subchannelsize contiguous PRBs, where numSubchannel and subchannelsize are higher layer parameters.

8.1 UE procedure for transmitting the physical sidelink shared channel

Each PSSCH transmission is associated with an PSCCH transmission.

That PSCCH transmission carries the $1^{st}$ stage of the SCI associated with the PSSCH transmission; the $2^{nd}$ stage of the associated SCI is carried within the resource of the PSSCH.

If the UE transmits SCI format 0-1 on PSCCH according to a PSCCH resource configuration in slot n and PSCCH resource m, then for the associated PSSCH transmission in the same slot
  one transport block is transmitted with up to two layers;
  The number of layers (u) is determined according to the "Number of DMRS port" field in the SCI
  The set of consecutive symbols within the slot for transmission of the PSSCH is determined according to clause 8.1.2.1;
  The set of contiguous resource blocks for transmission of the PSSCH is determined according to clause 8.1.2.2;
  [ . . . ]

8.1.2 Resource allocation
  In sidelink resource allocation mode 1:
  for PSSCH and PSCCH transmission, dynamic grant, configured grant type 1 and configured grant type 2 are supported.

8.1.2.1 Resource allocation in time domain
  The UE shall transmit the PSSCH in the same slot as the associated PSCCH.
  The minimum resource allocation unit in the time domain is a slot.
  The UE shall transmit the PSSCH in consecutive symbols within the slot, subject to the following restrictions:
    The UE shall not transmit PSSCH in symbols which are not configured for sidelink. A symbol is configured for sidelink, according to higher layer parameters startSLsymbols and lengthSLsymbols, where startSLsymbols is the symbol index of the first symbol of lengthSLsymbols consecutive symbols configured for sidelink.
    Within the slot, PSSCH resource allocation starts at symbol startSLsymbols+1.
    The UE shall not transmit PSSCH in symbols which are configured for use by PSFCH, if PSFCH is configured in this slot.
    The UE shall not transmit PSSCH in the last symbol configured for sidelink.
    The UE shall not transmit PSSCH in the symbol immediately preceding the symbols which are configured for use by PSFCH, if PSFCH is configured in this slot.
  In sidelink resource allocation mode 1:
  For sidelink dynamic grant, the PSSCH transmission is scheduled by a DCI format 3_0.
  For sidelink configured grant type 2, the configured grant is activated by a DCI format 3_0.
  For sidelink dynamic grant and sidelink configured grant type 2:
    The "Time gap" field value m of the DCI format 3_0 provides an index m+1 into a slot offset table. That table is given by higher layer parameter timeGapFirstSidelinkTransmission and the table value at index m+1 will be referred to as slot offset $K_{SL}$.
    The slot of the first sidelink transmission scheduled by the DCI is the first SL slot of the corresponding resource pool that starts not earlier than $$T_{DL} - \frac{T_{TA}}{2} + K_{SL} \times T_{slot}$$

where $T_{DL}$ is starting time of the downlink slot carrying the corresponding DCI, $T_{TA}$ is the timing advance value and $K_{SL}$ is the slot offset between the slot DCI and the first sidelink transmission scheduled by DCI, $T_c$ is as defined in 38.211, and $T_{slot}$ is the SL slot duration.

For sidelink configured grant type 1:
The slot of the first sidelink transmissions follows the higher layer configuration according to [10, TS 38.321].

8.1.2.2 Resource allocation in frequency domain

The resource allocation unit in the frequency domain is the sub-channel.

The sub-channel assignment for sidelink transmission is determined using the "Frequency resource assignment" field in the associated SCI.

The lowest sub-channel for sidelink transmission is the sub-channel on which the lowest PRB of the associated PSCCH is transmitted.

If a PSSCH scheduled by a PSCCH would overlap with resources containing the PSCCH, the resources corresponding to a union of the PSCCH that scheduled the PSSCH and associated PSCCH DM-RS are not available for the PSSCH.
[ . . . ]

8.1.4 ue procedure for determining the subset of resources to be reported to higher layers in PSSCH resource selection in sidelink resource allocation mode 2

In resource allocation mode 2, the higher layer can request the UE to determine a subset of resources from which the higher layer will select resources for PSSCH/PSCCH transmission. To trigger this procedure, in slot n, the higher layer provides the following parameters for this PSSCH/PSCCH transmission:
the resource pool from which the resources are to be reported;
L1 priority, $prio_{TX}$;
the remaining packet delay budget;
the number of sub-channels to be used for the PSSCH/PSCCH transmission in a slot, $L_{subCH}$;
optionally, the resource reservation interval, $P_{rsvp\_Tx}$, in units of ms.

The following higher layer parameters affect this procedure:
t2 min_SelectionWindow: internal parameter $T_{2\ min}$ is set to the corresponding value from higher layer parameter t2 min_SelectionWindow for the given value of $prio_{TX}$.
SL-ThresRSRP_pi_pj: this higher layer parameter provides an RSRP threshold for each combination ($p_i$, $p_j$), where $p_i$ is the value of the priority field in a received SCI format 0-1 and $p_j$ is the priority of the transmission of the UE selecting resources; for a given invocation of this procedure, $p_j=prio_{TX}$.
RSforSensing selects if the UE uses the PSSCH-RSRP or PSCCH-RSRP measurement, as defined in clause 8.4.2.1.
reservationPeriodAllowed
t0_SensingWindow: internal parameter $T_0$ is defined as the number of slots corresponding to t0_SensingWindow ms.

The resource reservation interval, $P_{rsvp\_TX}$, if provided, is converted from units of ms to units of logical slots, resulting in $P_{rsvp\_TX}'$.

Notation:
($t_0^{SL}$, $t_1^{SL}$, $t_2^{SL}$, . . . ) denotes the set of slots which can belong to a sidelink resource pool and is defined in [TBD]. The following steps are used:

1) A candidate single-slot resource for transmission $R_{x,y}$ is defined as a set of $L_{subCH}$ contiguous sub-channels with sub-channel $x+j$ in slot $t_y^{SL}$ where $j=0, \ldots, L_{subCH}-1$. The UE shall assume that any set of $L_{subCH}$ contiguous sub-channels included in the corresponding resource pool within the time interval [$n+T_1, n+T_2$] correspond to one candidate single-slot resource, where
selection of $T_1$ is up to UE implementation under $0 \leq T_1 < T_{proc,1}$, where $T_{proc,1}$ is TBD;
if $T_{2\ min}$ is shorter than the remaining packet delay budget (in slots) then $T_2$ is up to UE implementation subject to $T_{2\ min} \leq T_2 \leq$ remaining packet budget (in slots); otherwise $T_2$ is set to the remaining packet delay budget (in slots).

The total number of candidate single-slot resources is denoted by $M_{total}$.

2) The sensing window is defined by the range of slots [$n-T_0, n-T_{proc,0}$) where $T_0$ is defined above and $T_{proc,1}$ is TBD. The UE shall monitor slots which can belong to a sidelink resource pool within the sensing window except for those in which its own transmissions occur. The UE shall perform the behaviour in the following steps based on PSCCH decoded and RSRP measured in these slots.

3) The internal parameter $Th(p_i)$ is set to the corresponding value from higher layer parameter SL-ThresRSRP_pi_pj for $p_j$ equal to the given value of $prio_{TX}$ and each priority value $p_i$.

4) The set $S_A$ is initialized to the set of all the candidate single-slot resources.

5) The UE shall exclude any candidate single-slot resource $R_{x,y}$ from the set $S_A$ if it meets all the following conditions:
the UE has not monitored slot $t_m^{SL}$ in Step 2.
for any periodicity value allowed by the higher layer parameter reservationPeriodAllowed and a hypothetical SCI format 0-1 received in slot $t_m^{SL}$ with "Resource reservation period" field set to that periodicity value and indicating all subchannels of the resource pool in this slot, condition c in step 6 would be met.

6) The UE shall exclude any candidate single-slot resource $R_{x,y}$ from the set $S_A$ if it meets all the following conditions:
a) the UE receives an SCI format 0-1 in slot $t_m^{SL}$, and "Resource reservation period" field, if present, and "Priority" field in the received SCI format 0-1 indicate the values $P_{rsvp\_RX}$ and $prio_{RX}$, respectively according to Clause [TBD] in [6, TS 38.213];
b) the RSRP measurement performed, according to clause 8.4.2.1 for the received SCI format 0-1, is higher than $Th(prio_{RX})$;
c) the SCI format received in slot tor the same SCI format which, if and only if the "Resource reservation period" field is present in the received SCI format 0-1, is assumed to be received in slot(s) $t_{m+q \times P_{rsvp\_RX}'}^{SL}$ determines according to clause [TBD] in [6, TS 38.213] the set of resource blocks and slots which overlaps with $R_{x,y+j \times P_{rsvp\_TX}'}$ for $q=1, 2, \ldots, Q$ and $j=0, 1, \ldots, C_{reset}-1$. Here, $P_{rsvp\_RX}'$ is $P^{rsvp\_RX}$ converted to units of logical slots, $$Q = \left\lceil \frac{T_{scal}}{P_{rsvp\_RX}} \right\rceil \text{ if } P_{rsvp\_RX} < T_{scal}$$

and n'−m≤$P_{rsvp\_RX}'$, where $t_{n'}^{SL}$=n if slot n belongs to the set ($t_0^{SL}, t_1^{SL}, \ldots, t_{T_{max}}^{SL}$), otherwise slot $t_{n'}^{SL}$ is the first slot after slot n belonging to the set ($t_0^{SL}, t_1^{SL}, \ldots, t_{T_{max}}^{SL}$); otherwise Q=1. $T_{scal}$ is FFS.

7) If the number of candidate single-slot resources remaining in the set $S_A$ is smaller than 0.2·$M_{total}$, then Th($p_i$) is increased by 3 dB for each priority value Th($p_i$) and the procedure continues with step 4.

The UE shall report set $S_A$ to higher layers.

8.1.5 UE procedure for determining slots and resource blocks for PSSCH transmission associated with an SCI format 0-1

The set of slots and resource blocks for PSSCH transmission is determined by the resource used for the PSCCH transmission containing the associated SCI format 0-1, and fields "Frequency resource assignment", "Time resource assignment" of the associated SCI format 1 as described below.

[TBD]
[ . . . ]

8.3 UE procedure for receiving the physical sidelink shared channel

For sidelink resource allocation mode 1, a UE upon detection of SCI format 0-1 on PSCCH can decode PSSCH according to the detected SCI format 0-2, and associated PSSCH resource configuration configured by higher layers.

For sidelink resource allocation mode 2, a UE upon detection of SCI format 0-1 on PSCCH can decode PSSCH according to the detected SCI format 0-2, and associated PSSCH resource configuration configured by higher layers.

3GPP TS 38.321 v16.0.0 specifies Medium Access Control (MAC) protocol specification in NR as follows:

5.22 SL-SCH Data transfer
5.22.1 SL-SCH Data transmission
5.22.1.1 SL Grant reception and SCI transmission Sidelink grant is received dynamically on the PDCCH, configured semi-persistently by RRC or autonomously selected by the MAC entity. The MAC entity shall have a sidelink grant on an active SL BWP to determine a set of PSCCH duration(s) in which transmission of SCI occurs and a set of PSSCH duration(s) in which transmission of SL-SCH associated with the SCI occurs.

If the MAC entity has been configured by RRC to transmit using a SL-RNTI or SLCS-RNTI as indicated in TS 38.331 [5] or TS 36.331 [21], the MAC entity shall for each PDCCH occasion and for each grant received for this PDCCH occasion:

1> if a sidelink grant has been received on the PDCCH for the MAC entity's SL-RNTI:
2> if the NDI received on the PDCCH has been not toggled compared to the value in the previously received HARQ information for the HARQ Process ID:
3> use the received sidelink grant to determine PSCCH duration(s) and PSSCH duration(s) for one or more retransmissions of a single MAC PDU for the corresponding Sidelink process according to clause 8.1.2 of TS 38.214 [7];
2> else:
3> use the received sidelink grant to determine PSCCH duration(s) and PSSCH duration(s) for initial transmission and, if available, retransmission(s) of a single MAC PDU according to clause 8.1.2 of TS 38.214 [7];
2> consider the received sidelink grant to be a configured sidelink grant;
2> if a configured sidelink grant is available for retransmission(s) of a MAC PDU which has been positively acknowledged as specified in clause 5.22.1.3.3:
3> clear the PSCCH duration(s) and PSSCH duration(s) corresponding to retransmission(s) of the MAC PDU from the configured sidelink grant;
1> else if a sidelink grant has been received on the PDCCH for the MAC entity's SLCS-RNTI:
2> if PDCCH contents indicate retransmission(s) for an activated configured sidelink grant:
3> use the received sidelink grant to determine PSCCH duration(s) and PSSCH duration(s) for one or more retransmissions of a single MAC PDU according to clause 8.1.2 of TS 38.214 [7];
2> else if PDCCH contents indicate configured grant Type 2 deactivation for a configured sidelink grant:
3> clear the configured sidelink grant, if available;
3> trigger configured sidelink grant confirmation for the configured sidelink grant;
2> else if PDCCH contents indicate configured grant Type 2 activation for a configured sidelink grant:
3> trigger configured sidelink grant confirmation for the configured sidelink grant;
3> store the configured sidelink grant;
3> initialise or re-initialise the configured sidelink grant to determine the set of PSCCH durations and the set of PSSCH durations for transmissions of multiple MAC PDUs according to clause 8.1.2 of TS 38.214 [7].

[ . . . ]

The MAC entity shall for each PSSCH duration:
1> for each configured sidelink grant occurring in this PSSCH duration:
2> if the MAC entity has been configured by RRC to transmit using a SL-RNTI or SLCS-RNTI:
3> select a MCS which is, if configured, within the range that is configured by RRC between sl-MinMCS-PSSCH and sl-MaxMCS-PSSCH included in SL-ScheduledConfig;
2> else:
3> select a MCS which is, if configured, within the range that is configured by RRC between sl-MinMCS-PSSCH and sl-MaxMCS-PSSCH included in sl-PSSCH-TxConfigList and, if configured by RRC, overlapped between sl-MinMCS-PSSCH and sl-MaxMCS-PSSCH indicated in sl-CBR-PSSCH-TxConfigList for the highest priority of the sidelink logical channel(s) in the MAC PDU and the CBR measured by RRC according to TS 38.2xx [xx] if CBR measurement results are available or the corresponding sl-defaultTxConfigIndex configured by RRC if CBR measurement results are not available;

NOTE 3: MCS selection is up to UE implementation if the MCS or the corresponding range is not configured by upper layers.

2> deliver the sidelink grant, the selected MCS, and the associated HARQ information to the Sidelink HARQ Entity for this PSSCH duration.

[ . . . ]

5.22.1.3 Sidelink HARQ operation
5.22.1.3.1 Sidelink HARQ Entity

The MAC entity includes at most one Sidelink HARQ entity for transmission on SL-SCH, which maintains a number of parallel Sidelink processes.

The maximum number of transmitting Sidelink processes associated with the Sidelink HARQ Entity is [TBD1]. A sidelink process may be configured for transmissions of multiple MAC PDUs. For transmissions of multiple MAC PDUs, the maximum number of transmitting Sidelink processes associated with the Sidelink HARQ Entity is [TBD2].

A delivered sidelink grant and its associated Sidelink transmission information are associated with a Sidelink process. Each Sidelink process supports one TB.

For each sidelink grant, the Sidelink HARQ Entity shall:
1> if the MAC entity determines that the the sidelink grant is used for initial transmission; and
1> if no MAC PDU has been obtained:
NOTE 1: For the configured grant Type 1 and 2, whether a sidelink grant is used for initial transmission or retransmission is up to UE implementation.
2> associate a Sidelink process to this grant, and for each associated Sidelink process:
3> obtain the MAC PDU to transmit from the Multiplexing and assembly entity, if any;
3> if a MAC PDU to transmit has been obtained:
4> determines Sidelink transmission information of the TB for the source and destination pair of the MAC PDU as follows:
5> set the Source Layer-1 ID to the 16 MSB of the Source Layer-2 ID of the MAC PDU;
5> set the Destination Layer-1 ID to the 8 MSB of the Destination Layer-2 ID of the MAC PDU;
5> consider the NDI to have been toggled and set the NDI to the toggled value;
NOTE 2: The initial value of the NDI set to the very first transmission for the Sidelink HARQ Entity is left to UE implementation.
5> associate the Sidelink process to a Sidelink process ID;
NOTE 3: How UE determine Sidelink process ID in SCI is left to UE implementation for NR sidelink.
5> enable HARQ feedback, if sl-HARQ-FeedbackEnabled has been set to Enabled for the logical channel(s) in the MAC PDU;
5> set the priority to the value of the highest priority of the logical channel(s) and a MAC CE, if any, if included, in the MAC PDU;
5> set the communication range to the value of the longest communication range of the logical channel(s) in the MAC PDU, if configured;
5> set the location information to the Zone_id determined as specified in TS 38.331 [5], if configured;
4> deliver the MAC PDU, the sidelink grant and the Sidelink transmission information of the TB to the associated Sidelink process;
4> instruct the associated Sidelink process to trigger a new transmission;
3> else:
4> flush the HARQ buffer of the associated Sidelink process.
1> else (i.e. retransmission):
2> identify the Sidelink process associated with this grant, and for each associated Sidelink process:
3> if sl-MaxTransNum corresponding to the highest priority of the logical channel(s) in the MAC PDU has been configured in sl-CG-MaxTransNumList for the sidelink grant by RRC and the maximum number of transmissions of the MAC PDU has been reached to sl-MaxTransNum; or
3> if a positive acknowledgement to a transmission of the MAC PDU has been received according to clause 5.22.1.3.3; or
1> if only a negative acknowledgement was enabled in the SCI and no negative acknowledgement was received prioritized as specified in clause 5.4.2.2, and the sidelink transmission is prioritized over uplink transmission:
2> instruct the physical layer to transmit SCI according to the stored sidelink grant with the associated Sidelink transmission information;
2> instruct the physical layer to generate a transmission according to the stored sidelink grant;
2> if sl-HARQ-FeedbackEnabled has been set to enabled for the logical channel(s) in the MAC PDU:
3> instructs the physical layer to monitor PSFCH for the transmission as specified in TS 38.2xx [x].
1> if this transmission corresponds to the last transmission of the MAC PDU:
2> decrement SL_RESOURCE_RESELECTION_COUNTER by 1, if available.

The transmission of the MAC PDU is prioritized over uplink transmissions of the MAC entity or the other MAC entity if the following conditions are met:
1> if the MAC entity is not able to perform this sidelink transmission simultaneously with all uplink transmissions at the time of the transmission, and
1> if uplink transmission is neither prioritized as specified in clause 5.4.2.2 nor prioritized by upper layer according to TS [24.386] [xx]; and
1> if the value of the highest priority of logical channel(s) and a MAC CE in the MAC PDU is lower than sl-PrioritizationThres if sl-PrioritizationThres is configured.
NOTE 4: If the MAC entity is not able to perform this sidelink transmission simultaneously with all uplink transmissions as specified in clause 5.4.2.2 of TS 36.321 [22] at the time of the transmission, and prioritization-related information is not available prior to the time of this sidelink transmission due to processing time restriction, it is up to UE implementation whether this sidelink transmission is performed.

5.22.1.3.2 PSFCH reception

The MAC entity shall for each PSSCH transmission:
1> if an acknowledgement corresponding to the transmission in clause 5.22.1.3.1 is obtained from the physical layer:
2> deliver the acknowledgement to the corresponding Sidelink HARQ entity for the Sidelink process;
1> else:
2> deliver a negative acknowledgement to the corresponding Sidelink HARQ entity for the Sidelink process;
1> if sl-PUCCH-Config is configured by RRC:
2> instruct the physical layer to signal the acknowledgement corresponding to the transmission on the PUCCH according to clause 16.5 of TS 38.213 [x].

5.22.1.4 Multiplexing and assembly

For PDU(s) associated with one SCI, MAC shall consider only logical channels with the same Source Layer-2 ID-Destination Layer-2 ID pair for one of unicast, groupcast and broadcast which is associated with the pair. Multiple transmissions for different Sidelink processes are allowed to be independently performed in different PSSCH durations.

5.22.1.4.1 Logical channel prioritization 5.22.1.4.1.1 General

The sidelink Logical Channel Prioritization procedure is applied whenever a new transmission is performed.

RRC controls the scheduling of sidelink data by signalling for each logical channel:
sl-Priority where an increasing priority value indicates a lower priority level;
sl-PrioritisedBitRate which sets the sidelink Prioritized Bit Rate (sPBR);

sl-BucketSizeDuration which sets the sidelink Bucket Size Duration (sBSD).

RRC additionally controls the LCP procedure by configuring mapping restrictions for each logical channel:

sl-configuredSLGrantType1Allowed which sets whether a configured grant Type 1 can be used for sidelink transmission.

The following UE variable is used for the Logical channel prioritization procedure:

SBj which is maintained for each logical channel j.

The MAC entity shall initialize SBj of the logical channel to zero when the logical channel is established.

For each logical channel j, the MAC entity shall:
1> increment SBj by the product sPBR×T before every instance of the LCP procedure, where T is the time elapsed since SBj was last incremented;
1> if the value of SBj is greater than the sidelink bucket size (i.e. sPBR×sBSD):
2> set SBj to the sidelink bucket size.

NOTE: The exact moment(s) when the UE updates SBj between LCP procedures is up to UE implementation, as long as SBj is up to date at the time when a grant is processed by LCP.

5.22.1.4.1.2 Selection of logical channels

The MAC entity shall for each SCI corresponding to a new transmission:
1> select a Destination associated to one of unicast, groupcast and broadcast, having the logical channel with the highest priority or the MAC CE, among the logical channels that satisfy all the following conditions and MAC CE(s), if any, for the SL grant associated to the SCI:
2> SL data is available for transmission; and
2> SBj>0, in case there is any logical channel having SBj>0; and
2> sl-configuredSLGrantType1Allowed, if configured, is set to true in case the SL grant is a Configured Grant Type 1.

NOTE: If multiple Destinations have the logical channels satisfying all conditions above with the same highest priority or if multiple Destinations have the MAC CE, which Destination is selected among them is up to UE implementation.

1> select the logical channels satisfying all the following conditions among the logical channels belonging to the selected Destination:
2> SL data is available for transmission; and
2> sl-configuredSLGrantType1Allowed, if configured, is set to true in case the SL grant is a Configured Grant Type 1.

5.22.1.4.1.3 Allocation of sidelink resources

The MAC entity shall for each SCI corresponding to a new transmission:
1> allocate resources to the logical channels as follows:
2> logical channels selected in clause 5.22.1.4.1.2 for the SL grant with SBj>0 are allocated resources in a decreasing priority order. If the SL-PBR of a logical channel is set to infinity, the MAC entity shall allocate resources for all the data that is available for transmission on the logical channel before meeting the sPBR of the lower priority logical channel(s);
2> decrement SBj by the total size of MAC SDUs served to logical channel j above;
2> if any resources remain, all the logical channels selected in clause 5.22.1.4.1.2 are served in a strict decreasing priority order (regardless of the value of SBj) until either the data for that logical channel or the SL grant is exhausted, whichever comes first. Logical channels configured with equal priority should be served equally.

NOTE: The value of SBj can be negative.

The UE shall also follow the rules below during the SL scheduling procedures above:
the UE should not segment an RLC SDU (or partially transmitted SDU or retransmitted RLC PDU) if the whole SDU (or partially transmitted SDU or retransmitted RLC PDU) fits into the remaining resources of the associated MAC entity;
if the UE segments an RLC SDU from the logical channel, it shall maximize the size of the segment to fill the grant of the associated MAC entity as much as possible;
the UE should maximise the transmission of data;
if the MAC entity is given a sidelink grant size that is equal to or larger than 12 bytes while having data available and allowed (according to clause 5.22.1.4.1) for transmission, the MAC entity shall not transmit only padding;
A logical channel configured with sl-HARQ-FeedbackEnabled set to enabled and a logical channel configured with sl-HARQ-FeedbackEnabled set to disabled cannot be multiplexed into the same MAC PDU.

The MAC entity shall not generate a MAC PDU for the HARQ entity if the following conditions are satisfied:
there is no Sidelink CSI Reporting MAC CE generated for this PSSCH transmission as specified in clause 5.22.1.7; and
the MAC PDU includes zero MAC SDUs.

Logical channels shall be prioritised in accordance with the following order (highest priority listed first):
data from SCCH;
Sidelink CSI Reporting MAC CE;
data from any STCH.

5.22.1.4.2 Multiplexing of MAC SDUs

The MAC entity shall multiplex MAC SDUs in a MAC PDU according to clauses 5.22.1.3.1 and 6.1.6.

In the RAN1 #94 meeting (as discussed in 3GPP R1-1810051), RAN1 has the following agreements about NR V2X:

Agreements:
At least two sidelink resource allocation modes are defined for NR-V2X sidelink communication
Mode 1: Base station schedules sidelink resource(s) to be used by UE for sidelink transmission(s)
Mode 2: UE determines (i.e. base station does not schedule) sidelink transmission resource(s) within sidelink resources configured by base station/network or pre-configured sidelink resources In the RAN1 #96bis meeting (as discussed in 3GPP R1-1905921), RAN1 has the following agreements about NR V2X:

Agreements:
It is supported, in a resource pool, that within the slots associated with the resource pool, PSFCH resources can be (pre)configured periodically with a period of N slot(s)
is configurable, with the following values
1
At least one more value>1
FFS details
The configuration should also include the possibility of no resource for PSFCH. In this case, HARQ feedback for all transmissions in the resource pool is disabled HARQ feedback for transmissions in a resource pool can only be sent on PSFCH in the same resource pool In the RAN1 #97 meeting (as discussed in 3GPP R1-1907973), RAN1 has the following agreements about NR V2X as follows:

Agreements:
  NR V2X Mode-2 supports resource reservation for feedback-based PSSCH retransmissions by signaling associated with a prior transmission of the same TB Agreements:
  RAN1 to further select between the following options of sidelink resource reservation for blind retransmissions:
    Option 1: A transmission can reserve resources for none, one, or more than one blind retransmission
    Option 2: A transmission can reserve resource for none or one blind retransmission Agreements:
  Support a sub-channel as the minimum granularity in frequency domain for the sensing for PSSCH resource selection
  No additional sensing for other channels Agreements:
  For the period of N slot(s) of PSFCH resource, N=2 and N=4 are additionally supported.

Agreements:
  For a PSSCH transmission with its last symbol in slot n, when the corresponding HARQ feedback is due for transmission, it is expected to be in slot n+a where a is the smallest integer larger than or equal to K with the condition that slot n+a contains PSFCH resources.

Agreements:
  At least for the case when the PSFCH in a slot is in response to a single PSSCH:
    Implicit mechanism is used to determine at least frequency and/or code domain resource of PSFCH, within a configured resource pool. At least the following parameters are used in the implicit mechanism:
      Slot index (FFS details) associated with PSCCH/PSSCH/PSFCH
      Sub-channel(s) (FFS details) associated with PSCCH/PSSCH
      Identifier (FFS details) to distinguish each RX UE in a group for Option 2 groupcast HARQ feedback In the RAN1 #98 meeting (as discussed in 3GPP R1-1909942), RAN1 has the following agreements about NR V2X:

Agreements:
  The resource (re-)selection procedure includes the following steps
    Step 1: Identification of candidate resources within the resource selection window
      FFS details
    Step 2: Resource selection for (re-)transmission(s) from the identified candidate resources
      FFS details In the RAN1 #99 meeting (as discussed in the Draft Report of 3GPP TSG RAN WG1 #99 V1.0.0), RAN1 has the following agreements about NR V2X:

Agreements:
  From RAN1 perspective, a configured grant for SL can carry a TB for which SL HARQ FB is enabled or disabled.
  For any CG, if there is a possibility to carry a TB with SL HARQ FB being enabled, there is always a corresponding PSFCH configuration
  A TB with SL HARQ FB is enabled can be carried by a CG only if there is a corresponding PSFCH configuration for the CG
  For a TB with SL HARQ FB is disabled, up to RAN2 how to utilize a CG for the transmission R1-1913417
Agreements:
  For dynamic grant, DCI contains HARQ ID and NDI.

Agreements:
  For dynamic grant, DCI indicates the time-frequency resource allocation with the signalling format used for SCI.
  In addition, the starting sub-channel for initial transmission is signalled in DCI.

Agreements:
  To provide additional resources for retransmission upon receiving a SL NACK report, a dynamic grant is used.
    When the initial transmission of a TB is scheduled by a dynamic grant, the CRC of the DCI carrying the dynamic grant is scrambled using the SL RNTI introduced for DCI for a dynamic grant.
      The interpretation of NDI is the same as for Uu for retransmission scheduled by DCI with CRC scrambled by C-RNTI
    When the initial transmission of a TB is scheduled by a configured grant (type-1 or type-2), the CRC of the DCI carrying the dynamic grant is scrambled using the SL RNTI introduced for DCI for a configured grant type-2.
      For interpretation of NDI, the Uu behavior for retransmission scheduled by DCI with CRC scrambled by CS-RNTI is reused.
    (working assumption) The HARQ ID is used to identify the TB for which resources for retransmission are provided (subject to the indication of re-transmission via NDI)

Agreements:
  At least the following parameters are part of a SL configured grant configuration:
    Configuration index of the CG
    Time offset (for type-1 only)
    Time-frequency allocation (for type-1 only)
      Using the same format as in DCI.
    Periodicity
    The configured grant is associated with a single transmit resource pool.
    RAN2 can add other parameters if deemed necessary by RAN2
  A UE in mode 1 is configured at least with one transmit resource pool
  For type-2 CG, the time-frequency allocation and the configuration index of the CG are indicated in DCI.
    All parameters for CG type 2 for activation DCI re-use the same respective parameters configured for CG type 1, when applicable Agreements:
  Support W to be equal to 32 slots Agreements:
  On a per resource pool basis, when reservation of a sidelink resource for an initial transmission of a TB at least by an SCI associated with a different TB is enabled:
    A period is additionally signalled in SCI and the same reservation is applied with respect to resources indicated within $N_{MN}$ (within window W at subsequent periods A set of possible period values is the following: 0, [1:99], 100, 200, 300, 400, 500, 600, 700, 800, 900, 1000 ms
<=4 bits are used in SCI to indicate a period
An actual set of values is (pre-)configured Agreements:
In determining PSFCH candidate resources for a PSFCH format from the starting sub-channel index and the slot index used for the corresponding PSSCH for actual transmission,
Notation
S: the number of sub-channels in a slot
N: the number of PSSCH slots associated with a single PSFCH slot
$N_F$: the number of PRBs in the set (pre-)configured for the actual PSFCH resources.
Within the set of PRBs (pre-)configured for the actual PSFCH resources, the first Z PRBs are associated with the first sub-channel in the first slot associated with the PSFCH slot, the second Z PRBs are associated with the first sub-channel in the second slot associated with the PSFCH slot, and so on.
FFS when $N_E$ is not a multiple of S*N
For a PSSCH, the candidate PSFCH resource is the set of PRBs associated with
Option 1: the starting sub-channel and slot used for that PSSCH.
Option 2: the sub-channel(s) and slot used for that PSSCH Agreements:
When a RX UE sends one bit HARQ-ACK in PSFCH
ACK and NACK are differentiated using different cyclic shift of the same base sequence in the same PRB.
The cyclic shift corresponding to ACK is not defined/used for groupcast option 1.

Working Assumption:
One PSFCH transmission can include up to X HARQ-ACK bits.
X=1

Agreements:
For Case 3 (PSFCH TX with multiple HARQ feedback to the same UE),
For PSFCH resource period N=2 and 4,
Solution of Case 2 applies, i.e., select M PSFCH(s) transmissions at least based on priority rule.

Working Assumption:
For the PSFCH candidate resource set with Z PRBs and Y cyclic shift pairs in each PRB,
Each PSFCH resource is indexed in the manner of frequency first and cyclic shift second.
FFS the order of cyclic shift indexing in a PRB.
PSFCH resource with the index ((K+M) mod (Z*Y)) is used for PSFCH transmission of a RX UE.
K is the L1 source ID of the associated PSCCH/PSSCH.
M is 0 for unicast and groupcast feedback option 1 and M is the member ID of the RX UE for groupcast feedback option 2.
FFS whether to have the following restriction.
Groupcast HARQ feedback option 2 is not used if X>Z*Y (Y denotes the number of PSFCH in a PRB).
Note: RAN1 assumes that the member ID M is an integer between 0 and X-1.

In the RAN1 #100-e meeting (as discussed in the Draft Report of 3GPP TSG RAN WG1 #100-e V0.2.0), RAN1 has the following agreements about NR V2X:
Agreements:
For resource pool configuration, slots for a resource pool is (pre-)configured with bitmap, which is applied with periodicity.

Agreements:
For derivation of the set of slots to be included in the resource pool, the baseline is the derivation with bitmap and periodicity based on Subclause 14.1.5 of TS36.213 with the following modifications.
FFS: Periodicity and L_bitmap value
The slot index is relative to slot #0 of the radio frame corresponding to SFN 0 of the serving cell if serving cell timing reference is in use, or DFN 0 otherwise
The following procedure is used.
The set includes all the slots except the following slots:
Slots in which SLSS resource is configured,
(Working assumption) slots not having at least Y-th, (Y+1)-th, . . . , (Y+X-1)-th symbols in a slot semi-statically for UL as indicated in TDD-UL-DL-ConfigCommon, where
X is sl-LengthSymbols
Y is sl-StartSymbol
(Working assumption) reserved slots which are determined by the similar steps in Subclause 14.1.5 of TS36.213

Agreements:
The mapping between the values of HPN signaled in DCI and HPN signaled in SCI is fixed for a TB, and is up to UE implementation.
For dynamic grant, the toggling of NDI in DCI is used as the toggling of NDI in SCI for the first SL transmission scheduled by the DCI. The SCI for the remaining transmissions scheduled by the DCI, if any, have the NDI untoggled with respect to the first SL transmission.

Agreements:
Only one new TB can be transmitted in one period of the configured grant.
FFS any issue with retransmission spanning multiple periods
The DCI scheduling the retransmissions uses the first HARQ process ID corresponding to the first transmission of the TB, as agreed for Q2.

Agreements:
The TX UE reports NACK to the gNB in the following cases:
When it does not transmit the corresponding PSCCH/PSSCH due to intra-UE prioritization.
When it does not receive the corresponding PSFCH due to intra-UE prioritization.

Agreements
For groupcast option 2 in the case where there are multiple PSFCHs corresponding to multiple PSCCH/PSSCH transmissions of a single TB, the TX UE reports ACK to the gNB if it has received ACK at least once from each RX UE. Otherwise, it reports NACK to the gNB.

Agreements
For groupcast option 2, the TX UE reports NACK to the gNB when it does not detect some expected PSFCH.

Agreements
For configured grant, the TX UE reports ACK to the gNB in case no PSCCH/PSSCH is transmitted in a set of resources.

NOTE: The rule in Q1 has precedence over this rule.
Agreements:
  In Step 2, a UE ensures a minimum time gap Z=a+b between any two selected resources of a TB where a HARQ feedback for the first of these resources is expected
    'a' is a time gap between the end of the last symbol of the PSSCH transmission of the first resource and the start of the first symbol of the corresponding PSFCH reception determined by resource pool configuration and higher layer parameters of MinTimeGapPSFCH and periodPSFCHresource
    'b' is a time required for PSFCH reception and processing plus sidelink retransmission preparation including multiplexing of necessary physical channels and any TX-RX/RX-TX switching time and is determined by UE implementation
Agreements:
  Time resource assignment in SCI uses an extended time domain RIV mechanism as follows:

```
if N = 1
    TRIV = 0
elseif N = 2
    TRIV = T₁
else
    if (T₂ - T₁ - 1) ≤ 15
        TRIV = 30(T₂ - T₁ - 1) + T₁ + 31
    else
        TRIV = 30(31 - T₂ + T₁) + 62 - T₁
    end if
end if
``` where
  N denotes the actual number of resources indicated
  Ti denotes i-th resource time offset
    for N=2, $1 \leq T_1 \leq 31$
    for N=3, $1 \leq T_1 \leq 30$, $T_1 < T_2 \leq 31$
Agreements:
Agreement:
  One of the following two options is (pre-)configured per resource pool.
    Option 1: The set of PRBs for the candidate PSFCH resource is determined by the starting sub-channel and slot used for that PSSCH.
    Option 2: The set of PRBs for the candidate PSFCH resource is determined by the sub-channel(s) and slot used for that PSSCH.
  One or multiple of following terminologies may be used hereafter:
  BS: A network central unit or a network node in NR which is used to control one or multiple TRPs which are associated with one or multiple cells. Communication between BS and TRP(s) is via fronthaul. BS could also be referred to as central unit (CU), eNB, gNB, or NodeB.
  TRP: A transmission and reception point provides network coverage and directly communicates with UEs. TRP could also be referred to as distributed unit (DU) or network node.
  Cell: A cell is composed of one or multiple associated TRPs, i.e. coverage of the cell is composed of coverage of all associated TRP(s). One cell is controlled by one BS. Cell could also be referred to as TRP group (TRPG).
  NR-PDCCH: A channel carries downlink control signal which is used to control communication between a UE and a network side. A network transmits NR-PDCCH on configured control resource set (CORESET) to the UE.
  UL-control signal: An UL-control signal may be scheduling request(SR), channel state information(CSI), HARQ-ACK/NACK for downlink transmission.
  Slot: A scheduling unit in NR. Each slot duration is 14 OFDM symbols.
  Mini-slot: A mini-slot is a scheduling unit with duration less than 14 OFDM symbols.
  Slot format information (SFI): Information of slot format of symbols in a slot. A symbol in a slot may belong to following type: downlink, uplink, unknown or other. The slot format of a slot could at least convey transmission direction of symbols in the slot.
  DL common signal: Data channel carrying common information that targets for multiple UEs in a cell or all UEs in a cell. Examples of DL common signal could be system information, paging, RAR.
  One or multiple of following assumptions for network side may be used hereafter:
    Downlink timing of TRPs in the same cell are synchronized.
    RRC layer of network side is in BS.
  One or multiple of following assumptions for UE side may be used hereafter:
    There are at least two UE (RRC) states: connected state (or called active state) and non-connected state (or called inactive state or idle state). Inactive state may be an additional state or belong to connected state or non-connected state.
  In the RAN1 #94 meeting (as discussed in 3GPP R1-1810051), for NR V2X transmission, there are two sidelink resource allocation modes defined for NR-V2X sidelink communication:
    mode 1 is where base station or network node can schedule sidelink resource(s) to be used by UE for sidelink transmission(s);
    mode 2 is where UE selects or determines (i.e. base station or network node does not schedule) sidelink transmission resource(s) within sidelink resources configured by base station or network node or pre-configured sidelink resources.
  For network scheduling mode, e.g. mode 1, the network node may transmit a sidelink (SL) grant, e.g. Downlink Control Information (DCI) format 3_0, on Uu interface for scheduling resources of Physical Sidelink Control Channel (PSCCH) and/or Physical Sidelink Shared Channel (PSSCH). The V2X UE may perform PSCCH and PSSCH transmissions on PC5 interface, in response to the received sidelink grant. The Uu interface could be the wireless interface for communication between network node and UE. The PC5 interface could be the wireless interface for communication (directly) between UEs or devices.
  For UE (autonomous) selection mode, e.g. mode 2, since transmission resource is not scheduled or assigned via network node, the UE may require performing sensing before selecting a resource for transmission (e.g., sensing-based transmission), in order to avoid resource collision and interference from or to other UEs. Based on the result of sensing procedure, the UE can determine or identify candidate resources within the resource selection window. The identified candidate resources may be reported to higher layers (of the UE). The UE may select one or multiple resources from the identified candidate resources to perform sidelink transmission(s) from the UE. The transmission(s) from the UE may be PSCCH and/or PSSCH transmission.

Since NR V2X has requirement of high reliability and high throughput, it can support SL HARQ feedback for unicast and/or groupcast. It means that a TX UE may transmit a sidelink data transmission to a RX UE, and then the RX UE may transmit SL HARQ feedback to the TX UE via PSFCH transmission. If the SL HARQ feedback is ACK, it may mean that the RX UE receives and decodes the sidelink data transmission successfully. When the TX UE receives the SL HARQ feedback as ACK, the TX UE may transmit another new sidelink data transmission to the RX UE if there are available data from the TX UE to the RX UE. If the SL HARQ feedback is NACK or the TX UE does not receive the SL HARQ feedback, it may mean the RX UE does not receive and/or decode the sidelink data transmission successfully. When the TX UE receives the SL HARQ feedback as NACK or the TX UE does not receive the SL HARQ feedback, the TX UE may retransmit the sidelink data transmission to the RX UE. Since the sidelink data retransmission carries the same data packet as the sidelink data transmission, the RX UE may combine the sidelink data transmission and sidelink data retransmission and then perform decoding for the data packet. The combining can increase possibility of decoding successfully.

The RAN1 #96bis meeting (as discussed in 3GPP R1-1905921) supports that in a resource pool, PSFCH resources are (pre)configured periodically with a period of slot(s), wherein N can be configured as 1, 2, or 4, as discussed in 3GPP R1-1905921 and R1-1907973. For a slot (pre)configured with PSFCH resources, the PSFCH resources in the slot are in the last one or two sidelink symbols in the slot. Each PSFCH resource in the slot may contain same number of symbols.

When TX UE acquires sidelink resources, the TX UE may select a Destination associated to one of unicast (e.g. a RX UE), groupcast (e.g. a sidelink group) and broadcast, having the logical channel with the highest priority or the MAC CE, among the logical channels that have available SL data for transmission. SBj>0 and/or Configured Grant Type may be considered as well. When TX UE generates a MAC PDU for transmission on the sidelink resources, it may be possible to multiplex SL data from one or more sidelink logical channels associated with the same Destination. However, a logical channel configured with sl-HARQ-FeedbackEnabled set to enabled and a logical channel configured with sl-HARQ-FeedbackEnabled set to disabled cannot be multiplexed into the same MAC PDU.

In the RAN1 #100-e meeting (as discussed in the Draft Report of 3GPP TSG RAN WG1 #100-e V0.2.0), it is agreed that in mode 2, a UE ensures a minimum time gap Z=a+b between any two selected resources of a TB where a HARQ feedback for the first of these resources is expected. The value 'a' is a time gap between the end of the last symbol of the PSSCH transmission of the first resource and the start of the first symbol of the corresponding PSFCH reception determined by resource pool configuration and higher layer parameters of MinTimeGapPSFCH and period-PSFCHresource. The value 'b' is a time required for PSFCH reception and processing plus sidelink retransmission preparation including multiplexing of necessary physical channels and any TX-RX/RX-TX switching time and is determined by UE implementation. In other words, the concept is that for a TB with SL HARQ feedback enabled, the TX UE needs to select one or more resources wherein time gap between any two selected resources larger than to equal to minimum time gap Z. Thus, after TX UE performs sidelink data transmission on one of the selected resources, the TX UE can determine, depending on associated SL HARQ feedback, whether to perform sidelink data retransmission in next resource of the selected resources.

Currently, the minimum time gap Z for TB with SL HARQ feedback enabled is agreed for sidelink resource allocation mode 2. It is questionable about the relationship between sidelink resource allocation mode 1 and the minimum time gap Z. In mode2, sidelink resources selection or determination for a TB and logical channel prioritization or determination (LCP) for multiplexing SL data in a TB are both performed in device/UE side. The main difference in mode 1 is that sidelink resources for a TB are scheduled or assigned by network node, and logical channel prioritization or determination for multiplexing SL data in a TB is performed in device/UE side.

Generally, the network node may expect which logical channel(s) will be prioritized or determined in the device or UE side, and then schedule or assign proper sidelink resources. For instance, if the network node expects a logical channel with the highest priority or the MAC CE, among the logical channels that have available SL data for transmission in device or UE side, is enabled with SL HARQ feedback, the network node can schedule or assign corresponding sidelink resources with consideration on the minimum time gap Z. If the network node expects a logical channel with the highest priority or the MAC CE, among the logical channels that have available SL data for transmission in device or UE side, is not enabled with SL HARQ feedback, the network node can schedule or assign corresponding sidelink resources without consideration on the minimum time gap Z.

However, the expectation in network node does not always seem to work. For example, the UE may have new SL data arrival and not yet report it to network node. As another example, since the modulation and coding scheme is determined by the device or UE, the network node does not clearly know how many SL data have been delivered before. Therefore, there may be some misaligned issues.

As an example, the network node schedules or assigns multiple sidelink resources via a sidelink grant to a TX UE, wherein at least two of the multiple sidelink resources are with time gap less than the minimum time gap Z. However, the TX UE may generate a TB comprising sidelink data from SL logical channel(s) enabled with SL HARQ feedback. Thus, after TX UE performs sidelink data transmission on one of the multiple sidelink resources, it may be impossible for the TX UE to determine, depending on associated SL HARQ feedback, whether to perform sidelink data retransmission in next one of the multiple sidelink resources.

In another case, the network node schedules or assigns multiple sidelink resources via a sidelink grant to a TX UE, wherein any two of the multiple sidelink resources are with time gap larger than or equal to the minimum time gap Z. However, the TX UE may generate a TB comprising sidelink data from SL logical channel(s) disabled with SL HARQ feedback. If the SL logical channel(s) comprises urgent data or low latency data, the sidelink transmission(s) on the multiple sidelink resources may induce unnecessary latency.

In view of these misaligned issues, some concepts, mechanisms, methods, or embodiments are provided below.

Method a

The general concept of Method a is that the minimum time gap Z is considered for sidelink resource(s) in mode 1. Network node may (implicitly) control/schedule TX UE for selecting SL data from either SL logical channel(s) (or MAC PDU) with enabled SL HARQ feedback or SL logical channel(s) (or MAC PDU) with disabled SL HARQ feedback.

A TX UE may receive a SL grant from a network node. The SL grant may schedule/assign multiple sidelink resources. The TX UE may check whether time gap of any two (adjacent, neighbor, or consecutive) scheduled or assigned sidelink resources is larger than or equal to the minimum time gap Z.

In one embodiment, if (all) time gap of any two (adjacent, neighbor, or consecutive) scheduled or assigned sidelink resources is larger than or equal to the minimum time gap Z, the TX UE may determine to select (only) SL logical channel(s) (or MAC PDU) with enabled SL HARQ feedback. The TX UE may be allowed to select SL logical channel(s) (or MAC PDU) with enabled SL HARQ feedback. The TX UE may generate a TB, which comprises or multiplexes SL data from (only) SL logical channel(s) (or MAC PDU) with enabled SL HARQ feedback. The TX UE may preclude or exclude from selecting SL logical channel(s) (or MAC PDU) with disabled SL HARQ feedback. The TX UE may generate a TB, which precludes or excludes from comprising or multiplexing SL data from SL logical channel(s) (or MAC PDU) with disabled SL HARQ feedback. In other words, the Logical Channel Prioritization (LCP) for the Transport Block (TB) may be performed among (only) SL logical channel(s) (or MAC PDU) with enabled SL HARQ feedback. In one embodiment, the LCP for the TB may be performed among (only) SL logical channel(s) (or MAC PDU) with enabled SL HARQ feedback and with available SL data and with SBj>0.

In one embodiment, if at least a time gap of any two (adjacent, neighbor, or consecutive) scheduled or assigned sidelink resources is less than the minimum time gap Z, the TX UE may determine to select (only) SL logical channel(s) (or MAC PDU) with disabled SL HARQ feedback. The TX UE may generate a TB, which comprises or multiplexes SL data from (only) SL logical channel(s) (or MAC PDU) with disabled SL HARQ feedback. The TX UE may preclude or exclude from selecting SL logical channel(s) (or MAC PDU) with enabled SL HARQ feedback. The TX UE may generate a TB, which precludes or excludes from comprising or multiplexing SL data from SL logical channel(s) (or MAC PDU) with enabled SL HARQ feedback. In other words, the LCP for the TB may be performed among (only) SL logical channel(s) (or MAC PDU) with disabled SL HARQ feedback. In one embodiment, the LCP for the TB may be performed among (only) SL logical channel(s) (or MAC PDU) with disabled SL HARQ feedback and with available SL data and with SBj>0.

In one embodiment, if at least a time gap of any two (adjacent, neighbor, or consecutive) scheduled or assigned sidelink resources is larger than or equal to the minimum time gap Z, the TX UE may determine to select (only) SL logical channel(s) (or MAC PDU) with enabled SL HARQ feedback. The TX UE may be allowed to select SL logical channel(s) (or MAC PDU) with enabled SL HARQ feedback. The TX UE may generate a TB, which comprises or multiplexes SL data from (only) SL logical channel(s) (or MAC PDU) with enabled SL HARQ feedback. The TX UE may preclude or exclude from selecting SL logical channel(s) (or MAC PDU) with disabled SL HARQ feedback. The TX UE may generate a TB, which precludes or excludes from comprising or multiplexing SL data from SL logical channel(s) (or MAC PDU) with disabled SL HARQ feedback. In other words, the LCP for the TB may be performed among (only) SL logical channel(s) (or MAC PDU) with enabled SL HARQ feedback. In one embodiment, the LCP for the TB may be performed among (only) SL logical channel(s) (or MAC PDU) with enabled SL HARQ feedback and with available SL data and with SBj>0.

In one embodiment, if (all) time gap of any two (adjacent, neighbor, or consecutive) scheduled or assigned sidelink resources is less than the minimum time gap Z, the TX UE may determine to select (only) SL logical channel(s) (or MAC PDU) with disabled SL HARQ feedback. The TX UE may generate a TB, which comprises or multiplexes SL data from (only) SL logical channel(s) (or MAC PDU) with disabled SL HARQ feedback. The TX UE may preclude or exclude from selecting SL logical channel(s) (or MAC PDU) with enabled SL HARQ feedback. The TX UE may generate a TB, which precludes or excludes from comprising or multiplexing SL data from SL logical channel(s) (or MAC PDU) with enabled SL HARQ feedback. In other words, the LCP for the TB may be performed among (only) SL logical channel(s) (or MAC PDU) with disabled SL HARQ feedback. In one embodiment, the LCP for the TB may be performed among (only) SL logical channel(s) (or MAC PDU) with disabled SL HARQ feedback and with available SL data and with SBj>0.

In one embodiment, the TX UE may perform one or more sidelink transmission(s) on one or more of the multiple sidelink resources scheduled or assigned by the SL grant. The one or more sidelink transmission comprises or delivers the generated TB.

Method b

The general direction of Method b is that the minimum time gap Z is not considered for sidelink resource(s) in mode 1 for TB generation. A TX UE may receive a SL grant from a network node. The SL grant may schedule or assign multiple sidelink resources. In one embodiment, the TX UE may generate a TB. The TX UE may perform one or more sidelink transmission(s) on one or more of the multiple sidelink resources scheduled or assigned by the SL grant. The one or more sidelink transmission comprises/delivers the generated TB.

In one embodiment, when the TX UE generates the TB for sidelink transmission, the TX UE may not check whether time gap of any two (adjacent, neighbor, or consecutive) scheduled or assigned sidelink resources is larger than or equal to the minimum time gap Z. The TX UE may perform LCP for the TB among SL logical channel(s)logical channel(s) (or MAC PDU) with enabled SL HARQ feedback and SL logical channel(s)logical channel(s) (or MAC PDU) with disabled SL HARQ feedback. The TX UE may perform LCP for the TB among SL logical channel(s) (or MAC PDU) without considering enabled or disabled SL HARQ feedback. The TX UE may perform LCP for the TB among SL logical channel(s)logical channel(s) (or MAC PDU) with available SL data and with SBj>0 and without considering enabled or disabled SL HARQ feedback.

There may be at least four embodiments:

First Embodiment—In the first embodiment, (all) time gap of any two (adjacent, neighbor, or consecutive) scheduled or assigned sidelink resources may be larger than or equal to the minimum time gap Z, and the TX UE may generate the TB, which comprises or multiplexes SL data from (only) SL logical channel(s)logical channel(s) (or MAC PDU) with enabled SL HARQ feedback. It may mean that the expectation of network node aligns to TX UE's sidelink buffer status. In one embodiment, the TX UE may transmit one or more sidelink control information to schedule the one or more sidelink data transmissions. The TX UE may transmit the one or more sidelink control information to schedule, indicate, or reserve the one or more of the multiple sidelink resources. In one embodiment, the one or more sidelink control information may indicate RX UE to transmit SL HARQ feedback.

As shown in exemplary FIG. 8a, PSSCH1 and/or PSSCH2 may comprise the same TB, which comprises or multiplexes SL data from SL logical channel(s)logical channel(s) (or MAC PDU) with enabled SL HARQ feedback. SCI1 and/or SCI2 may indicate RX UE to transmit SL HARQ feedback.

As shown in exemplary FIG. 9a, PSSCH1, PSSCH 2, and/or PSSCH 3 may comprise the same TB, which comprises or multiplexes SL data from SL logical channel(s) logical channel(s) (or MAC PDU) with enabled SL HARQ feedback. SCI1, SCI2, and/or SCI3 may indicate RX UE to transmit SL HARQ feedback.

Second Embodiment—In the second embodiment, at least a time gap of any two (adjacent, neighbor, or consecutive) scheduled or assigned sidelink resources may be less than the minimum time gap Z, and the TX UE may generate the TB, which comprises or multiplexes SL data from (only) SL logical channel(s)logical channel(s) (or MAC PDU) with disabled SL HARQ feedback. It may mean that the expectation of network node aligns to TX UE's sidelink buffer status. In one embodiment, the TX UE may transmit one or more sidelink control information to schedule the one or more sidelink data transmissions. The TX UE may transmit the one or more sidelink control information to schedule, indicate, or reserve the one or more of the multiple sidelink resources. The one or more sidelink control information may indicate RX UE not to transmit SL HARQ feedback.

Figure 8:
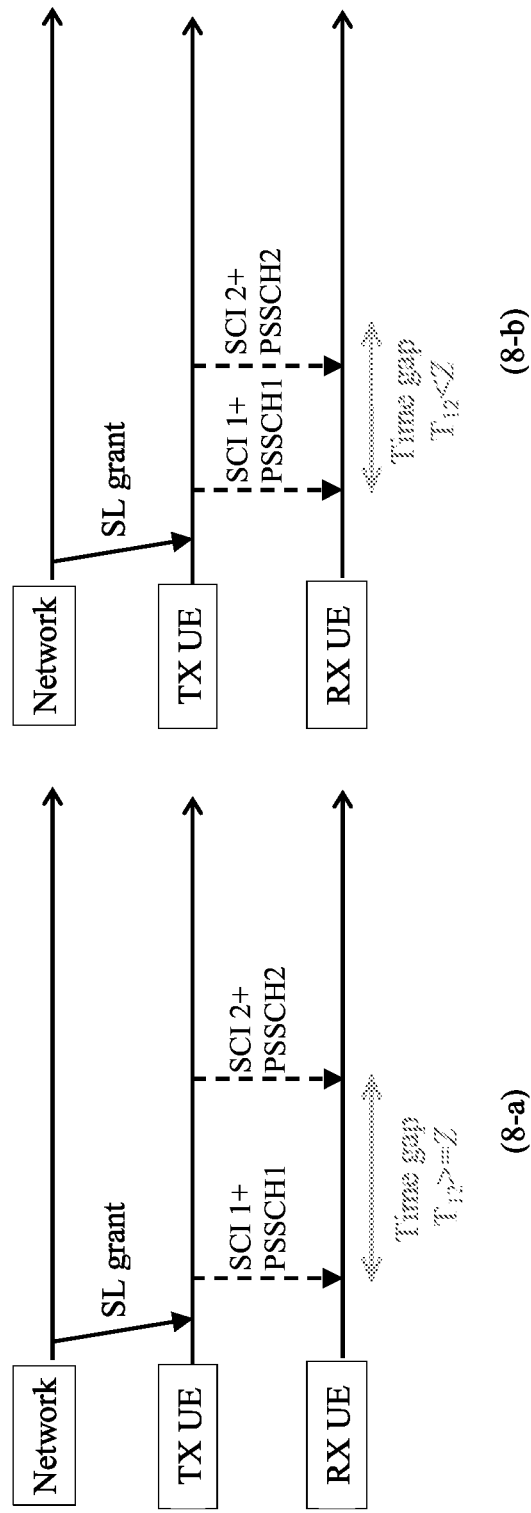
FIG. 8 is a diagram according to one exemplary embodiment.

As shown in exemplary FIG. 8-b, PSSCH1 and/or PSSCH 2 may comprise the same TB, which comprises or multiplexes SL data from SL logical channel(s)logical channel(s) (or MAC PDU) with disabled SL HARQ feedback. SCI1 and/or SCI2 may indicate RX UE not to transmit SL HARQ feedback.

Figure 9:
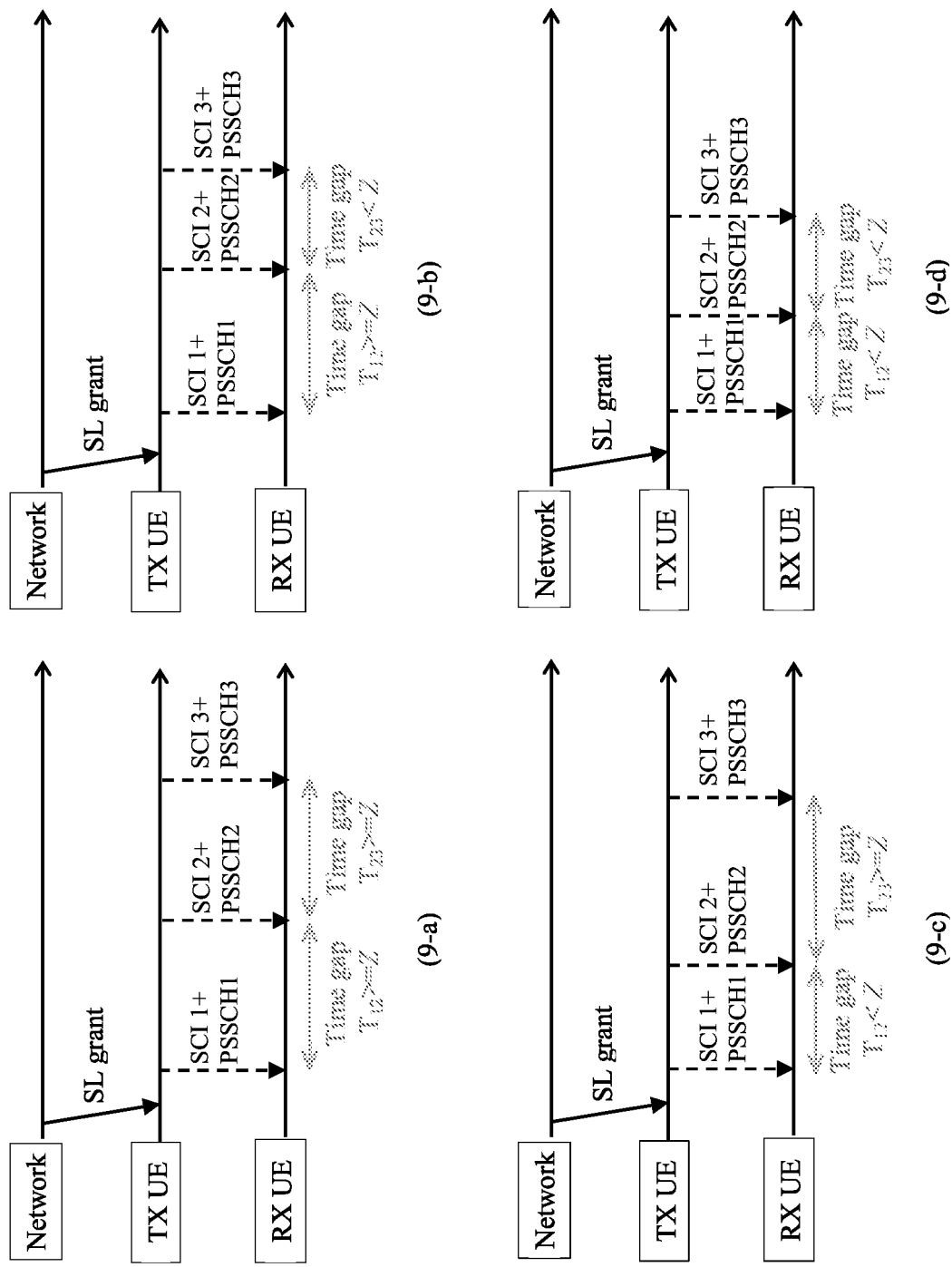
FIG. 9 is a diagram according to one exemplary embodiment.

As shown in exemplary FIG. 9-b, 9-c, or 9-d, PSSCH1, PSSCH 2, and/or PSSCH 3 may comprise the same TB, which comprises or multiplexes SL data from SL logical channel(s) (or MAC PDU) with disabled SL HARQ feedback. SCI1, SCI2, and/or SCI3 may indicate RX UE not to transmit SL HARQ feedback.

Third Embodiment—In third embodiment, at least a time gap of any two (adjacent, neighbor, or consecutive) scheduled or assigned sidelink resources may be less than the minimum time gap Z, and the TX UE may generate the TB, which comprises or multiplexes SL data from (only) SL logical channel(s)logical channel(s) (or MAC PDU) with enabled SL HARQ feedback. It may mean that the expectation of network node does not align to TX UE's sidelink buffer status.

As shown in exemplary FIG. 8-b, PSSCH1 and/or PSSCH 2 may comprise the same TB, which comprises or multiplexes SL data from SL logical channel(s)logical channel(s) (or MAC PDU) with enabled SL HARQ feedback.

As shown in exemplary FIG. 9-b, 9-c, or 9-d, PSSCH1, PSSCH 2, and/or PSSCH 3 may comprise the same TB, which comprises or multiplexes SL data from SL logical channel(s)logical channel(s) (or MAC PDU) with enabled SL HARQ feedback.

In one embodiment, the TX UE may transmit one or more sidelink control information to schedule the one or more sidelink data transmissions. The TX UE may transmit the one or more sidelink control information to schedule, indicate, or reserve the one or more of the multiple sidelink resources.

In one embodiment, (all) the one or more sidelink control information may indicate RX UE to transmit SL HARQ feedback. It may mean that RX UE may transmit one or more SL HARQ feedback transmissions associated with the one or more sidelink data transmission respectively. The RX UE may transmit one or more SL HARQ feedback transmissions on one or more sidelink feedback resources, which are associated with the one or more sidelink resources respectively. As shown in exemplary FIG. 8-b, SCI1 and/or SCI2 may indicate RX UE to transmit SL HARQ feedback. As shown in exemplary FIG. 9-b, 9-c, or 9-d, SCI1, SCI2, and/or SCI3 may indicate RX UE to transmit SL HARQ feedback.

Additionally or alternatively, the last sidelink control information (in time domain) among the one or more sidelink control information may indicate RX UE to transmit SL HARQ feedback. The other sidelink control information(s) may indicate RX UE not to transmit SL HARQ feedback. It may mean that RX UE may transmit one SL HARQ feedback transmission associated with the last one sidelink data transmission (in time domain). The RX UE may transmit one SL HARQ feedback transmissions on one sidelink feedback resource, which is associated with the last one sidelink resource (in time domain). As shown in exemplary FIG. 8-b, SCI1 may indicate RX UE not to transmit SL HARQ feedback, and/or SCI2 may indicate RX UE to transmit SL HARQ feedback. As shown in exemplary FIG. 9-b, 9-c, or 9-d, SCI1 and/or SCI2 may indicate RX UE not to transmit SL HARQ feedback, and/or SCI3 may indicate RX UE to transmit SL HARQ feedback.

Additional or alternatively, the last sidelink control information (in time domain) among the one or more sidelink control information, before TX UE reports corresponding HARQ report to network node (considering processing time to generate the corresponding HARQ report), may indicate RX UE to transmit SL HARQ feedback. The other sidelink control information(s) may indicate RX UE not to transmit SL HARQ feedback. It may mean that RX UE may transmit one SL HARQ feedback transmission associated with the last one sidelink data transmission (in time domain), before TX UE reports corresponding HARQ report to network node (considering processing time to generate the corresponding HARQ report). The RX UE may transmit one SL HARQ feedback transmissions on one sidelink feedback resource, which is associated with the last one sidelink resource (in time domain).

In one embodiment, TX UE reports corresponding HARQ report to network node, wherein corresponding HARQ report is set based on SL HARQ feedback associated with the last one sidelink resource. The processing time to generate the corresponding HARQ report may comprise any of SL HARQ feedback generation time of RX UE, SL HARQ feedback reception or decoding time of TX UE, and/or corresponding HARQ report generation time of TX UE. In one embodiment, the processing time to generate the corresponding HARQ report may equal to the minimum time gap Z.

As shown in exemplary FIG. 8-b, if TX UE reports corresponding HARQ report to network node in time occasion after SCI 2, SCI1 may indicate RX UE not to transmit SL HARQ feedback, and/or SCI2 may indicate RX UE to transmit SL HARQ feedback. As shown in exemplary FIG. 9-b, 9-c, or 9-d, if TX UE reports corresponding HARQ report to network node in time occasion after SCI 3, SCI1 and/or SCI2 may indicate RX UE not to transmit SL HARQ feedback, and/or SCI3 may indicate RX UE to transmit SL HARQ feedback. If TX UE reports corresponding HARQ report to network node in a time occasion between SCI2 and SCI3 and in a time occasion after SCI 3, SCI1 may indicate RX UE not to transmit SL HARQ feedback, and/or SCI2 and/or SCI3 may indicate RX UE to transmit SL HARQ feedback.

Additional or alternatively, if time gap of two adjacent, neighbor, or consecutive scheduled or assigned sidelink resources is larger than or equal to the minimum time gap Z, the sidelink control information in the first one or the earlier one (in time domain) of the two adjacent, neighbor, or consecutive scheduled or assigned resources may indicate RX UE to transmit SL HARQ feedback. If time gap of two adjacent, neighbor, or consecutive scheduled or assigned resources is less than the minimum time gap Z, the sidelink control information in the first one or the earlier one (in time domain) of the two adjacent, neighbor, or consecutive scheduled or assigned resources may indicate RX UE not to transmit SL HARQ feedback.

The sidelink control information in the last one (in time domain) or the latter one of the one or more sidelink resources may indicate RX UE to transmit SL HARQ feedback. It may mean that the TX UE requests RX UE to transmit SL HARQ feedback if time gap to next sidelink resource satisfies the minimum time gap Z. If time gap to next sidelink resource does not satisfy the minimum time gap Z, TX UE may not request RX UE to transmit SL HARQ feedback, since TX UE cannot determine whether to perform sidelink data transmission in the next sidelink resource depending on the SL HARQ feedback. The RX UE may transmit one SL HARQ feedback transmission associated with the one sidelink data transmission if the associated sidelink control information indicates to transmit SL HARQ feedback. The RX UE may transmit one SL HARQ feedback transmission on one sidelink feedback resource, which is associated with the one sidelink resource if the associated sidelink control information indicates to transmit SL HARQ feedback.

As shown in exemplary FIG. 8-*b*, SCI1 may indicate RX UE not to transmit SL HARQ feedback, and/or SCI2 may indicate RX UE to transmit SL HARQ feedback. As shown in exemplary FIG. 9-*b*, SCI1 and/or SCI3 may indicate RX UE to transmit SL HARQ feedback, and/or SCI2 may indicate RX UE not to transmit SL HARQ feedback. As shown in FIG. 9-*c*, SCI2 and/or SCI3 may indicate RX UE to transmit SL HARQ feedback, and/or SCI1 may indicate RX UE not to transmit SL HARQ feedback. As shown in FIG. 9-*d*, SCI1 and/or SCI2 may indicate RX UE not to transmit SL HARQ feedback, and/or SCI3 may indicate RX UE to transmit SL HARQ feedback.

Additionally or alternatively, if time gap of two adjacent, neighbor, or consecutive scheduled or assigned sidelink resources is less than the minimum time gap Z, and if two sidelink feedback resources associated with the two adjacent, neighbor, or consecutive scheduled or assigned resources are in the same slot, sidelink control information in the first one or the earlier one (in time domain) of the two adjacent, neighbor, or consecutive scheduled or assigned sidelink resources may indicate RX UE not to transmit SL HARQ feedback. Sidelink control information in the second one or the latter one (in time domain) of the two adjacent, neighbor, or consecutive scheduled or assigned resources may indicate RX UE to transmit SL HARQ feedback.

Additionally or alternatively, if time gap of two adjacent, neighbor, or consecutive scheduled or assigned sidelink resources is less than the minimum time gap Z, and if two sidelink feedback resources associated with the two adjacent, neighbor, or consecutive scheduled or assigned sidelink resources are in the same slot, sidelink control information in the second one or the latter one (in time domain) of the two adjacent, neighbor, or consecutive scheduled or assigned sidelink resources may indicate RX UE not to transmit SL HARQ feedback (except the second one of the two adjacent, neighbor, or consecutive scheduled or assigned resources is the last resource scheduled or assigned by the SL grant). Sidelink control information in the first one or the earlier one (in time domain) of the two adjacent, neighbor, or consecutive scheduled or assigned resources may indicate RX UE to transmit SL HARQ feedback. This is because it is sufficient for RX UE to transmit, in one slot, one SL HARQ feedback associated with the TB.

Fourth Embodiment—In fourth embodiment, (all) time gap of any two (adjacent, neighbor, or consecutive) scheduled or assigned sidelink resources may be larger than or equal to the minimum time gap Z, and TX UE may generate the TB, which comprises or multiplexes SL data from (only) SL logical channel(s)logical channel(s) (or MAC PDU) with disabled SL HARQ feedback. It may mean that the expectation of network node does not align to TX UE's sidelink buffer status. In one embodiment, TX UE may transmit one or more sidelink control information to schedule the one or more sidelink data transmissions. TX UE may transmit the one or more sidelink control information to schedule, indicate, or reserve the one or more of the multiple sidelink resources. In one embodiment, the one or more sidelink control information may indicate RX UE to transmit SL HARQ feedback.

As shown in exemplary FIG. 8-*a*, PSSCH1 and/or PSSCH 2 may comprise the same TB, which comprises or multiplexes SL data from SL logical channel(s) (or MAC PDU) with disabled SL HARQ feedback. SCI1 and/or SCI2 may indicate RX UE not to transmit SL HARQ feedback. As shown in exemplary FIG. 9-*a*, PSSCH1, PSSCH2, and/or PSSCH3 may comprise the same TB, which comprises or multiplexes SL data from SL logical channel(s) (or MAC PDU) with disabled SL HARQ feedback. SCI1, SCI2, and/or SCI3 may indicate RX UE not to transmit SL HARQ feedback.

Additionally or alternatively, there may be another four embodiments:

Fifth Embodiment—In the fifth embodiment, at least a time gap of any two (adjacent, neighbor, or consecutive) scheduled or assigned sidelink resources may be larger than or equal to the minimum time gap Z, and the TX UE may generate the TB, which comprises or multiplexes SL data from (only) SL logical channel(s) (or MAC PDU) with enabled SL HARQ feedback. It may mean that the expectation of network node aligns to TX UE's sidelink buffer status. In one embodiment, the TX UE may transmit one or more sidelink control information to schedule the one or more sidelink data transmissions. The TX UE may transmit the one or more sidelink control information to schedule, indicate, or reserve the one or more of the multiple sidelink resources. In one embodiment, the one or more sidelink control information may indicate RX UE to transmit SL HARQ feedback.

As shown in exemplary FIG. 8-*a*, PSSCH1 and/or PSSCH 2 may comprise the same TB, which comprises or multiplexes SL data from SL logical channel(s)logical channel(s) (or MAC PDU) with enabled SL HARQ feedback. SCI1 and/or SCI2 may indicate RX UE to transmit SL HARQ feedback. As shown in exemplary FIG. 9-*a*, 9-*b*, or 9-*c*, PSSCH1, PSSCH2, and/or PSSCH3 may comprise the same TB, which comprises or multiplexes SL data from SL logical channel(s)logical channel(s) (or MAC PDU) with enabled SL HARQ feedback. SCI1, SCI2, and/or SCI3 may indicate RX UE to transmit SL HARQ feedback.

Sixth Embodiment—In sixth embodiment, (all) time gap of any two (adjacent, neighbor, or consecutive) scheduled or assigned sidelink resources may be less than the minimum time gap Z, and TX UE may generate the TB, which comprises or multiplexes SL data from (only) SL logical channel(s) (or MAC PDU) with disabled SL HARQ feedback. It may mean that the expectation of network node aligns to TX UE's sidelink buffer status. In one embodiment, the TX UE may transmit one or more sidelink control information to schedule the one or more sidelink data transmissions. The TX UE may transmit the one or more sidelink control information to schedule, indicate, or reserve the one or more of the multiple sidelink resources. In one embodiment, the one or more sidelink control information may indicate RX UE not to transmit SL HARQ feedback.

As shown in exemplary FIG. 8-*b*, PSSCH1 and/or PSSCH 2 may comprise the same TB, which comprises or multiplexes SL data from SL logical channel(s)logical channel(s) (or MAC PDU) with disabled SL HARQ feedback. SCI1 and/or SCI2 may indicate RX UE not to transmit SL HARQ feedback.

As shown in exemplary FIG. 9-*b*, PSSCH1, PSSCH2, and/or PSSCH3 may comprise the same TB, which comprises or multiplexes SL data from SL logical channel(s) (or MAC PDU) with disabled SL HARQ feedback. SCI1, SCI2, and/or SCIS may indicate RX UE not to transmit SL HARQ feedback.

Seventh Embodiment—In seventh embodiment, (all) time gap of any two (adjacent, neighbor, or consecutive) scheduled or assigned sidelink resources may be less than the minimum time gap Z, and TX UE may generate the TB, which comprises or multiplexes SL data from (only) SL logical channel(s) (or MAC PDU) with enabled SL HARQ feedback. It may mean that the expectation of network node does not align to TX UE's sidelink buffer status.

As shown in exemplary FIG. 9-*b*, PSSCH1 and/or PSSCH 2 may comprise the same TB, which comprises or multiplexes SL data from SL logical channel(s) (or MAC PDU) with enabled SL HARQ feedback. As shown in exemplary FIG. 9-*d*, PSSCH1, PSSCH 2, and/or PSSCH 3 may comprise the same TB, which comprises or multiplexes SL data from SL logical channel(s)logical channel(s) (or MAC PDU) with enabled SL HARQ feedback.

In one embodiment, the TX UE may transmit one or more sidelink control information to schedule the one or more sidelink data transmissions. The TX UE may transmit the one or more sidelink control information to schedule, indicate, or reserve the one or more of the multiple sidelink resources.

In one embodiment, (all) the one or more sidelink control information may indicate RX UE to transmit SL HARQ feedback. It may mean that RX UE may transmit one or more SL HARQ feedback transmissions associated with the one or more sidelink data transmission respectively. The RX UE may transmit one or more SL HARQ feedback transmissions on one or more sidelink feedback resources, which are associated with the one or more sidelink resources respectively. As shown in exemplary FIG. 8-*b*, SCI1 and/or SCI2 may indicate RX UE to transmit SL HARQ feedback. As shown in exemplary FIG. 9-*d*, SCI1, SCI2, and/or SCI3 may indicate RX UE to transmit SL HARQ feedback.

Additionally or alternatively, the last sidelink control information (in time domain) among the one or more sidelink control information may indicate RX UE to transmit SL HARQ feedback. The other sidelink control information(s) may indicate RX UE not to transmit SL HARQ feedback. It may mean that RX UE may transmit one SL HARQ feedback transmission associated with the last one sidelink data transmission (in time domain). The RX UE may transmit one SL HARQ feedback transmissions on one sidelink feedback resource, which is associated with the last one sidelink resource (in time domain).

As shown in exemplary FIG. 8-*b*, SCI1 may indicate RX UE not to transmit SL HARQ feedback, and/or SCI2 may indicate RX UE to transmit SL HARQ feedback. As shown in exemplary FIG. 9-*d*, SCI1 and/or SCI2 may indicate RX UE not to transmit SL HARQ feedback, and/or SCI3 may indicate RX UE to transmit SL HARQ feedback.

Additionally or alternatively, the last sidelink control information (in time domain) among the one or more sidelink control information, before TX UE reports corresponding HARQ report to network node (considering processing time to generate the corresponding HARQ report), may indicate RX UE to transmit SL HARQ feedback. The other sidelink control information(s) may indicate RX UE not to transmit SL HARQ feedback. It may mean that RX UE may transmit one SL HARQ feedback transmission associated with the last one sidelink data transmission (in time domain), before TX UE reports corresponding HARQ report to network node (considering processing time to generate the corresponding HARQ report). RX UE may transmit one SL HARQ feedback transmissions on one sidelink feedback resource, which is associated with the last one sidelink resource (in time domain).

In one embodiment, TX UE may report corresponding HARQ report to network node, wherein corresponding HARQ report is set based on SL HARQ feedback associated with the last one sidelink resource. The processing time to generate the corresponding HARQ report may comprise any of SL HARQ feedback generation time of RX UE, SL HARQ feedback reception or decoding time of TX UE, and/or corresponding HARQ report generation time of TX UE. In one embodiment, the processing time to generate the corresponding HARQ report may equal to the minimum time gap Z.

As shown in exemplary FIG. 8-*b*, if TX UE reports corresponding HARQ report to network node in time occasion after SCI 2, SCI1 may indicate RX UE not to transmit SL HARQ feedback, and/or SCI2 may indicate RX UE to transmit SL HARQ feedback. As shown in exemplary FIG. 9-*d*, if TX UE reports corresponding HARQ report to network node in time occasion after SCI 3, SCI1 and/or SCI2 may indicate RX UE not to transmit SL HARQ feedback, and/or SCI3 may indicate RX UE to transmit SL HARQ feedback. If TX UE reports corresponding HARQ report to network node in a time occasion between SCI2 and SCI3 and in a time occasion after SCI 3, SCI1 may indicate RX UE not to transmit SL HARQ feedback, and/or SCI2 and/or SCI3 may indicate RX UE to transmit SL HARQ feedback.

Additionally or alternatively, if time gap of two adjacent, neighbor, or consecutive scheduled or assigned resources is less than the minimum time gap Z, and if two sidelink feedback resources associated with the two adjacent, neighbor, or consecutive scheduled or assigned resources are in the same slot, sidelink control information in the first one or the earlier one (in time domain) of the two adjacent, neighbored, or consecutive scheduled or assigned resources may indicate RX UE not to transmit SL HARQ feedback. Sidelink control information in the second one or the latter one (in time domain) of the two adjacent, neighbor, or consecutive scheduled or assigned resources may indicate RX UE to transmit SL HARQ feedback.

Additionally or alternatively, if time gap of two adjacent, neighbor, or consecutive scheduled or assigned resources is less than the minimum time gap Z, and if two sidelink feedback resources associated with the two adjacent, neighbor, or consecutive scheduled or assigned resources are in the same slot, sidelink control information in the second one or the latter one (in time domain) of the two adjacent, neighbor, or consecutive scheduled or assigned resources may indicate RX UE not to transmit SL HARQ feedback (except the second one of the two adjacent, neighbor, or consecutive scheduled or assigned resources is the last resource scheduled/assigned by the SL grant). Sidelink control information in the first one or the earlier one (in time domain) of the two adjacent, neighbor, or consecutive scheduled or assigned resources may indicate RX UE to transmit SL HARQ feedback. This is because it is sufficient for the RX UE to transmit, in one slot, one SL HARQ feedback associated with the TB.

Eighth Embodiment—In the eighth embodiment, at least a time gap of any two (adjacent, neighbor, or consecutive) scheduled or assigned sidelink resources may be larger than or equal to the minimum time gap Z, and TX UE may generate the TB, which comprises or multiplexes SL data from (only) SL logical channel(s) (or MAC PDU) with disabled SL HARQ feedback. It may mean that the expectation of network node does not align to TX UE's sidelink buffer status. In one embodiment, the TX UE may transmit one or more sidelink control information to schedule the one or more sidelink data transmissions. The TX UE may transmit the one or more sidelink control information to schedule, indicate, or reserve the one or more of the multiple sidelink resources. In one embodiment, the one or more sidelink control information may indicate RX UE to transmit SL HARQ feedback.

As shown in exemplary FIG. 8-*a*, PSSCH1 and/or PSSCH 2 may comprise the same TB, which comprises or multiplexes SL data from SL logical channel(s) (or MAC PDU) with disabled SL HARQ feedback. SCI1 and/or SCI2 may indicate RX UE not to transmit SL HARQ feedback.

As shown in exemplary FIG. 9-*a*, 9-*b*, or 9-*c*, PSSCH1, PSSCH2, and/or PSSCH3 may comprise the same TB, which comprises or multiplexes SL data from SL logical channel(s) (or MAC PDU) with disabled SL HARQ feedback. SCI1, SCI2, and/or SCIS may indicate RX UE not to transmit SL HARQ feedback.

For SCI1 in FIG. 8-*b*, SCI2 in FIG. 9-*b*, SCI1 in FIG. 9-*c*, or SCI1 and SCI2 in FIG. 9-*d*, it may be beneficial to indicate RX UE not to transmit SL HARQ feedback. Since when RX UE may need to select a subset of derived transmitted SL HARQ feedback(s) or RX UE may need to determine whether to perform transmission or reception of SL HARQ feedback on a slot with ((pre)configured) PSFCH resources, such SCI indication could release multiple SL HARQ feedbacks collision case of RX UE when determining the subset or either the transmission or reception of SL HARQ feedback.

Additionally or alternatively, there may be another embodiment:

Ninth Embodiment—In the ninth embodiment, at least a time gap of any two (adjacent, neighbor, or consecutive) scheduled or assigned sidelink resources may be less than the minimum time gap Z, and TX UE may generate the TB, which comprises or multiplexes SL data from (only) SL logical channel(s)logical channel(s) (or MAC PDU) with enabled SL HARQ feedback. It may mean that the expectation of network node does not align to TX UE's sidelink buffer status.

In one embodiment, the TX UE may (be allowed to) drop, skip, neglect, or cancel specific sidelink resource(s). The TX UE may (be allowed to) not perform sidelink transmission(s) on specific sidelink resource(s). The TX UE may (be allowed to) not perform sidelink data transmission and/or sidelink control information on the specific sidelink resource(s). The TX UE may (be allowed to) drop, skip, neglect, or cancel sidelink transmission(s) on specific sidelink resource(s). The TX UE may (be allowed to) drop, skip, neglect, or cancel sidelink data transmission and/or sidelink control information on the specific sidelink resource. More specifically, the specific sidelink resource(s) may be scheduled by SL grant from network.

In one embodiment, the specific sidelink resource(s) may be derived or determined based on time gap of any two (adjacent, neighbor, or consecutive) scheduled or assigned sidelink resources. If time gap of two (adjacent, neighbor, or consecutive) scheduled or assigned sidelink resources is larger than or equal to the minimum time gap Z, both the two scheduled or assigned sidelink resources may not be the specific sidelink resource(s).

In one embodiment, if time gap of two (adjacent, neighbor, or consecutive) scheduled or assigned sidelink resources is less than the minimum time gap Z, the first one or the earlier one (in time domain) of the two scheduled or assigned sidelink resources may be the specific sidelink resource. The last one (in time domain) or the latter one of the two scheduled or assigned sidelink resources may not be the specific sidelink resource(s). Additionally or alternatively, the last one (in time domain) or the latter one of the two scheduled or assigned sidelink resources may be the specific sidelink resource(s).

Additionally or alternatively, if time gap of two (adjacent, neighbor, or consecutive) scheduled or assigned sidelink resources is less than the minimum time gap Z, the last one (in time domain) or the latter one of the two scheduled or assigned sidelink resources may be the specific sidelink resource. The first one or the earlier one (in time domain) of the two scheduled or assigned sidelink resources may not be the specific sidelink resource(s).

In one embodiment, the TX UE may transmit one or more sidelink control information to schedule the one or more sidelink data transmissions. The TX UE may transmit the one or more sidelink control information to schedule, indicate, or reserve the one or more of the multiple sidelink resources. The one or more sidelink control information may not schedule, indicate, or reserve the specific sidelink resource(s). The TX UE may transmit the one or more sidelink control information (respectively) on the multiple sidelink resources scheduled or assigned by SL grant, excluding the specific sidelink resources.

In one embodiment, (all) the one or more sidelink control information may indicate RX UE to transmit SL HARQ feedback. Furthermore, (all) the one or more sidelink control information may indicate RX UE to transmit SL HARQ feedback, if CBR threshold is not exceed or achieved. It may mean that RX UE may transmit one or more SL HARQ feedback transmissions associated with the one or more sidelink data transmission respectively. The RX UE may transmit one or more SL HARQ feedback transmissions on one or more sidelink feedback resources, which are associated with the one or more sidelink resources respectively.

As shown in exemplary FIG. 8-*b*, the time gap of PSSCH1 and PSSCH2 may be less than the minimum time gap Z. The TX UE may perform SCI 1+PSSCH1, and may not perform SCI2+PSSCH2. PSSCH1 may comprise or multiplex SL data from SL logical channel(s)logical channel(s) (or MAC PDU) with enabled SL HARQ feedback. Additionally or alternatively, TX UE may perform SCI2+PSSCH2, and may not perform SCI1+PSSCH1. PSSCH2 may comprise or multiplex SL data from SL logical channel(s)logical channel(s) (or MAC PDU) with enabled SL HARQ feedback.

As shown in exemplary FIG. 9-*b*, the time gap of PSSCH2 and PSSCH3 may be less than the minimum time gap Z. In one embodiment, the TX UE may perform SCI 1+PSSCH1 and SCI 2+PSSCH2, and may not perform SCI3+PSSCH3. PSSCH1 and PSSCH2 may comprise the same TB, which comprises or multiplexes SL data from SL logical channel(s) (or MAC PDU) with enabled SL HARQ feedback. Additionally or alternatively, TX UE may perform SCI1+PSSCH1 and SCI3+PSSCH3, and may not perform SCI2+PSSCH2. PSSCH1 and PSSCH3 may comprise the same TB, which comprises or multiplexes SL data from SL logical channel(s) (or MAC PDU) with enabled SL HARQ feedback.

As shown in exemplary FIG. 9-*c*, the time gap of PSSCH1 and PSSCH2 may be less than the minimum time gap Z. In one embodiment, the TX UE may perform SCI1+PSSCH1 and SCI3+PSSCH3, and may not perform SCI2+PSSCH2. PSSCH1 and PSSCH3 may comprise the same TB, which comprises or multiplexes SL data from SL logical channel(s)logical channel(s) (or MAC PDU) with enabled SL HARQ feedback. Additionally or alternatively, the TX UE may perform SCI2+PSSCH2 and SCI3+PSSCH3, and may not perform SCI1+PSSCH1. PSSCH2 and PSSCH 3 may comprise the same TB, which comprises or multiplexes SL data from SL logical channel(s)logical channel(s) (or MAC PDU) with enabled SL HARQ feedback.

As shown in exemplary FIG. 9-*d*, the time gap of PSSCH1 and PSSCH2 may be less than the minimum time gap Z, and the time gap of PSSCH2 and PSSCH3 may be less than the minimum time gap Z. Preferably, the TX UE may perform SCI 1+PSSCH1 and SCI 3+PSSCH3, and may not perform SCI2+PSSCH2. PSSCH1 and PSSCH3 may comprise the same TB, which comprises or multiplexes SL data from SL logical channel(s)logical channel(s) (or MAC PDU) with enabled SL HARQ feedback. Additionally or alternatively, the TX UE may perform SCI2+PSSCH2, and may not perform SCI1+PSSCH1 or SCI 3+PSSCH3. PSSCH2 may comprise or multiplex SL data from SL logical channel(s) (or MAC PDU) with enabled SL HARQ feedback.

Method c

The general concept of Method c is that for a first set of logical channel(s) or MAC PDU, the minimum time gap Z may not be considered for sidelink resource(s) in mode 1. For a second set of logical channel(s) or MAC PDU, the minimum time gap Z may be considered for sidelink resource(s) in mode 1.

A TX UE may receive a SL grant from a network node. The SL grant may schedule or assign multiple sidelink resources. In one embodiment, the TX UE may generate a TB. The TX UE may perform one or more sidelink transmission(s) on one or more of the multiple sidelink resources scheduled or assigned by the SL grant. The one or more sidelink transmission comprises or delivers the generated TB.

In one embodiment, the TX UE may check whether time gap of any two (adjacent, neighbor, or consecutive) scheduled or assigned sidelink resources is larger than or equal to the minimum time gap Z. Additionally or alternatively, the TX UE may check whether time gap of any two (adjacent, neighbor, or consecutive) scheduled or assigned sidelink resources is less than the minimum time gap Z.

In one embodiment, the first set may be (pre-)configured. The second set may be (pre-)configured. Additionally or alternatively, the first set may comprise or mean logical channel(s) (or MAC PDU) with disabled SL HARQ feedback. The second set may comprise/mean logical channel(s) (or MAC PDU) with enabled SL HARQ feedback.

Additionally or alternatively, the first set may be (pre-)configured with priority lower than a threshold. The second set may be (pre-)configured with priority higher than a threshold. Additionally or alternatively, a first subset of the second set may be utilized if time gap of any two (adjacent, neighbor, or consecutive) scheduled or assigned sidelink resources is larger than or equal to the minimum time gap Z. A second subset of the second set may be utilized if time gap of any two (adjacent, neighbor, or consecutive) scheduled or assigned sidelink resources is less than the minimum time gap Z. In one embodiment, the first subset of the second set may be configured with enabled SL HARQ feedback. The second subset of the second set may be configured with disabled SL HARQ feedback.

In one embodiment, if (all) time gap of any two (adjacent, neighbor, or consecutive) scheduled or assigned sidelink resources is larger than or equal to the minimum time gap Z, the TX UE may determine to select logical channel(s) (or MAC PDU) among the first set and the second set. The TX UE may generate a TB, which comprises or multiplexes SL data from logical channel(s) (or MAC PDU) (only) among the first set and the second set. In other word, the LCP for the TB may be performed among (only) the first set and the second set of logical channel(s) (or MAC PDU). In one embodiment, the LCP for the TB may be performed among (only) the first set and the second set of logical channel(s) (or MAC PDU) and with available SL data and with SBj>0.

In one embodiment, if at least a time gap of any two (adjacent, neighbor, or consecutive) scheduled or assigned sidelink resources is less than the minimum time gap Z, the TX UE may determine to select logical channel(s)logical channel(s) (or MAC PDU) among the first set. The TX UE may generate a TB, which comprises or multiplexes SL data from logical channel(s) (or MAC PDU) (only) among the first set. The TX UE may preclude or exclude from selecting the second subset of logical channel(s)logical channel(s) (or MAC PDU). The TX UE may generate a TB, which precludes or excludes from comprising or multiplexing SL data from second set of logical channel(s)logical channel(s) (or MAC PDU). In other words, the LCP for the TB may be performed among (only) the first set of logical channel(s) logical channel(s) (or MAC PDU). In one embodiment, the LCP for the TB may be performed among (only) the first set of logical channel(s) (or MAC PDU) and with available SL data and with SBj>0.

In one embodiment, if at least a time gap of any two (adjacent, neighbor, or consecutive) scheduled or assigned sidelink resources is larger than or equal to the minimum time gap Z, the TX UE may determine to select logical channel(s)logical channel(s) (or MAC PDU) among the first set and the second set. The TX UE may generate a TB, which comprises or multiplexes SL data from logical channel(s) logical channel(s) (or MAC PDU) (only) among the first set and the second set. In other words, the LCP for the TB may be performed among (only) the first set and the second set of logical channel(s)logical channel(s) (or MAC PDU). In one embodiment, the LCP for the TB may be performed among (only) the first set and the second set of logical channel(s)logical channel(s) (or MAC PDU) and with available SL data and with SBj>0.

In one embodiment, if (all) time gap of any two (adjacent, neighbor, or consecutive) scheduled or assigned sidelink resources is less than the minimum time gap Z, the TX UE may determine to select logical channel(s)logical channel(s) (or MAC PDU) among the first set. The TX UE may generate a TB, which comprises or multiplexes SL data from logical channel(s) (or MAC PDU) (only) among the first set. The TX UE may preclude or exclude from selecting the second subset of logical channel(s) (or MAC PDU). The TX UE may generate a TB, which precludes or excludes from comprising or multiplexing SL data from second set of logical channel(s) (or MAC PDU). In other words, the LCP for the TB may be performed among (only) the first set of logical channel(s) (or MAC PDU). In one embodiment, the LCP for the TB may be performed among (only) the first set of logical channel(s)logical channel(s) (or MAC PDU) and with available SL data and with SBj>0.

In one embodiment, if (all) time gap of any two (adjacent, neighbor, or consecutive) scheduled or assigned sidelink resources is larger than or equal to the minimum time gap Z, the TX UE may determine to select logical channel(s)logical channel(s) (or MAC PDU) among the first set and the first subset. The TX UE may generate a TB, which comprises or multiplexes SL data from logical channel(s) (or MAC PDU) (only) among the first set and the first subset. The TX UE may preclude or exclude from selecting the second subset of logical channel(s)logical channel(s) (or MAC PDU). The TX UE may generate a TB, which precludes or excludes from comprising or multiplexing SL data from second set of logical channel(s) (or MAC PDU). In other words, the LCP for the TB may be performed among (only) the first set and the first subset of logical channel(s)logical channel(s) (or MAC PDU). In one embodiment, the LCP for the TB may be performed among (only) the first set and the first subset of logical channel(s) (or MAC PDU) and with available SL data and with SBj>0.

In one embodiment, if at least a time gap of any two (adjacent, neighbor, or consecutive) scheduled or assigned sidelink resources is less than the minimum time gap Z, the TX UE may determine to select logical channel(s)logical channel(s) (or MAC PDU) among the first set and the second subset. The TX UE may generate a TB, which comprises or multiplexes SL data from logical channel(s) (or MAC PDU) (only) among the first set and the second subset. The TX UE may preclude or exclude from selecting the first subset of logical channel(s)logical channel(s) (or MAC PDU). The TX UE may generate a TB, which precludes or excludes from comprising or multiplexing SL data from first set of logical channel(s)logical channel(s) (or MAC PDU). In other words, the LCP for the TB may be performed among (only) the first set and the second subset of logical channel(s)logical channel(s) (or MAC PDU). In one embodiment, the LCP for the TB may be performed among (only) the first set and the second subset of logical channel(s) (or MAC PDU) and with available SL data and with SBj>0.

In one embodiment, if at least a time gap of any two (adjacent, neighbor, or consecutive) scheduled or assigned sidelink resources is larger than or equal to the minimum time gap Z, the TX UE may determine to select logical channel(s)logical channel(s) (or MAC PDU) among the first set and the first subset. The TX UE may generate a TB, which comprises or multiplexes SL data from logical channel(s) (or MAC PDU) (only) among the first set and the first subset. The TX UE may preclude or exclude from selecting the second subset of logical channel(s) (or MAC PDU). The TX UE may generate a TB, which precludes or excludes from comprising or multiplexing SL data from second set of logical channel(s) (or MAC PDU). In other word, the LCP for the TB may be performed among (only) the first set and the first subset of logical channel(s) (or MAC PDU). In one embodiment, the LCP for the TB may be performed among (only) the first set and the first subset of logical channel(s) (or MAC PDU) and with available SL data and with SBj>0.

In one embodiment, if (all) time gap of any two (adjacent, neighbor, or consecutive) scheduled or assigned sidelink resources is less than the minimum time gap Z, the TX UE may determine to select logical channel(s) (or MAC PDU) among the first set and the second subset. The TX UE may generate a TB, which comprises or multiplexes SL data from logical channel(s) (or MAC PDU) (only) among the first set and the second subset. The TX UE may preclude or exclude from selecting the first subset of logical channel(s) (or MAC PDU). The TX UE may generate a TB, which precludes or excludes from comprising or multiplexing SL data from first set of logical channel(s)logical channel(s) (or MAC PDU). In other words, the LCP for the TB may be performed among (only) the first set and the second subset of logical channel(s) (or MAC PDU). In one embodiment, the LCP for the TB may be performed among (only) the first set and the second subset of logical channel(s)logical channel(s) (or MAC PDU) and with available SL data and with SBj>0.

For all above concepts, methods, alternatives and embodiments:

Note that any of above methods, alternatives and embodiments may be combined or applied simultaneously.

In one embodiment, the TX UE may check whether the sidelink resources scheduled or assigned by the SL grant can fulfill latency requirement of the SL data comprised or multiplexed in the TB. When the TX UE generates the TB for sidelink transmission, the TX UE can select (only) the logical channel(s) or MAC PDU wherein the sidelink resources scheduled or assigned by the SL grant satisfies the latency requirement of the logical channel(s) or MAC PDU. The TX UE may preclude or exclude to select the logical channel(s) or MAC PDU wherein the sidelink resources scheduled or assigned by the SL grant does not satisfy the latency requirement of the logical channel(s) or MAC PDU.

In one embodiment, when the TX UE generates the TB for sidelink transmission, the TX UE can select (only) the logical channel(s) or MAC PDU with latency requirement larger than or equal to the sidelink resources scheduled or assigned by the SL grant. The TX UE may preclude or exclude selecting the logical channel(s) or MAC PDU with latency requirement less than the sidelink resources scheduled or assigned by the SL grant.

In one embodiment, when the TX UE generates the TB for sidelink transmission, the TX UE can select (only) the logical channel(s) or MAC PDU with latency requirement larger than or equal to time gap between the first one and the last one (in time domain) among the sidelink resources scheduled or assigned by the SL grant. The TX UE may preclude or exclude selecting the logical channel(s) or MAC PDU with latency requirement less than time gap between the first one and the last one (in time domain) among the sidelink resources scheduled or assigned by the SL grant.

In one embodiment, when the TX UE generates the TB for sidelink transmission, the TX UE can select (only) the logical channel(s) or MAC PDU with latency requirement larger than or equal to the last one (in time domain) of the sidelink resources scheduled or assigned by the SL grant. The TX UE may preclude or exclude selecting the logical channel(s) or MAC PDU with latency requirement less than the last one (in time domain) of the sidelink resources scheduled/assigned by the SL grant.

In one embodiment, the latency requirement may mean validity time of the SL data. The latency requirement may mean remaining packet delay budget.

In one embodiment, the RX UE may transmit one or more SL HARQ feedback to the TX UE. The TX UE may receive or detect one or more SL HARQ feedback from the RX UE. The SL HARQ feedback may be associated with the one or more sidelink transmission(s). The SL HARQ feedback may be associated with the one or more sidelink data transmission(s) and/or the one or more sidelink control information.

In one embodiment, the TX UE may report corresponding HARQ report to network node. The corresponding HARQ report may indicate whether the TX UE requests additional or other sidelink resources for retransmission of the TB or not. The corresponding HARQ report may be set based on the one or more SL HARQ feedback. The corresponding HARQ report may be set based on SL HARQ feedback associated with the last one of the one or more sidelink transmission(s) (in time domain). The corresponding HARQ report may be set based on SL HARQ feedback associated with the last one sidelink resource (in time domain).

In one embodiment, the HARQ report may comprise an HARQ-ACK location. The HARQ-ACK location may correspond to or may deliver SL HARQ feedback, wherein the SL HARQ feedback is associated to the SL grant. The HARQ-ACK location may correspond to or may deliver a SL HARQ feedback, wherein the SL HARQ feedback is set based on the one or more SL HARQ feedback (e.g. set as the last SL HARQ feedback). The HARQ-ACK location may correspond to or may deliver a SL HARQ feedback, wherein the SL HARQ feedback is one of the one or more SL HARQ feedback (e.g. the last SL HARQ feedback). The HARQ-ACK location may be determined based on (slot of, time resource of, frequency resource of, and/or code resource of) PSFCH comprising the SL HARQ-ACK. The HARQ-ACK location may be determined based on (slot of, time resource of, frequency resource of, and/or code resource of) PSFCH, wherein the PSFCH is associated to the last or latest scheduled sidelink resource by the SL grant.

For example, in FIG. 9-b, assuming PSFCH1 is associated to PSSCH1, PSFCH2 is associated to PSSCH2, and PSFCH3 is associated to PSSCH3, PSFCH2 and PSFCH 3 may be in a same slot and/or occupy same symbol and/or occupy different frequency resources. PSFCH1 may be in different slot than PSFCH2 and PSFCH3. If TX UE decides to transmit PSSCH1 and PSSCH2, TX UE may consider PSSCH3 is specific sidelink resource and does not transmit PSSCH3 (due to time gap smaller than Z compared to PSSCH2). In this example, although there is no PSSCH3 transmission, TX UE may determine or place the received SL HARQ feedback from PSFCH2 on a HARQ-ACK location in a HARQ report. The HARQ-ACK location may be determined based on or associated to PSFCH3 (rather than PSFCH2). TX UE transmits the HARQ report on a PUCCH resource, wherein time resource of the PUCCH resource is referred to PSFCH3.

In one embodiment, the TX UE may transmit or deliver an information to network node. The information may indicate whether TB comprises or multiplexes SL data from (only) logical channel(s)logical channel(s) (or MAC PDU) with enabled SL HARQ feedback or SL data from (only) logical channel(s)logical channel(s) (or MAC PDU) with disabled SL HARQ feedback. The information may indicate whether the requested additional or other sidelink resources for retransmission of the TB need to satisfy that time gap of any two (adjacent, neighbor, or consecutive) additional or another sidelink resources may be larger than or equal to the minimum time gap Z or not. The information may indicate that the TX UE requests additional or other sidelink resources for retransmission of the TB with time gap of any two (adjacent, neighbor, or consecutive) additional or another sidelink resources being larger than or equal to the minimum time gap Z, or to indicate that the TX UE requests additional or other sidelink resources for retransmission of the TB with time gap of any two (adjacent, neighbor, or consecutive) additional or another sidelink resources being less than the minimum time gap Z. The information may indicate whether the requested additional or another sidelink resources for retransmission of the TB need to satisfy the minimum time gap Z or not. The information may indicate that the TX UE requests additional or other sidelink resources for retransmission of the TB with need of satisfying the minimum time gap Z, or to indicate that the TX UE requests additional or other sidelink resources for retransmission of the TB without need of satisfying the minimum time gap Z. The information may be HARQ-ACK in a location in the HARQ report.

In one embodiment, a combination of locations in the HARQ report could indicate the SL HARQ-ACK associated to the SL grant and the information. For example, in FIG. 9-b, TX UE transmits PSSCH1 and PSSCH2 and does not transmit PSSCH3, and TX UE receives SL HARQ-ACK in PSFCH 2. In this example, TX UE transmits the SL HARQ-ACK on a location associated to PSFCH3 and places the information in a second location associated to PSFCH2 (for indicating PSSCH2 is not transmitted). When the network receives HARQ report, the network may know the situation that the TX UE does not transmit PSSCH2 due to some reasons (e.g., does not meet minimum time gap Z requirement). In this example, possible combination of locations could be (the information or ACK, the SL HARQ-ACK) associated to (PSFCH2, PSFCH3). In general, only one location is associated to SL HARQ-ACK (the location associated to PSFCH3), and the other locations associated to PSFCH1 and/or PSFCH2 may be reserved or meaningless.

Hence, in FIG. 9-b, TX UE indicates (NACK, the information or ACK, the SL HARQ-ACK) associated to (PSFCH1, PSFCH2, PSFCH3). If there is an earlier HARQ report associated to another SL grant, and the earlier HARQ report comprises location associated to PSFCH1, TX UE could transmit the information on the location in case TX UE does not transmit or decides not to transmit PSSCH1 (due to not meet minimum time gap Z requirement).

As another example, in FIG. 9-c, in case TX UE does not transmit PSSCH1, TX UE transmits the information on a location associated to PSFCH1. In case TX UE does not transmit PSSCH2, TX UE transmits the information on a location associated to PSFCH2. Furthermore, in FIG. 9-d, in case TX UE transmits PSSCH1 and PSSCH3, TX UE transmits the information on a location associated to PSFCH2 and/or transmits the received SL HARQ-ACK (on PSFCH1 and/or PSFCH3) on a location associated to PSFCH3.

In one embodiment, TX UE may transmit the information on a location associated to PSFCH1. The network may determine whether scheduled sidelink resource(s) associated to SL grant meet the requirement Z or not based on the information received on any one of location(s) associated to PSFCH corresponding to each scheduled sidelink resource. A location may mean a location in a HARQ report to the network.

In one embodiment, the information on a location associated to PSFCH2 may indicate that PSSCH1 and PSSCH2 does not meet time gap requirement and/or that PSSCH2 and PSSCH3 does not meet time gap requirement.

In one embodiment, the TX UE may deliver the information with the corresponding HARQ report. The information may be delivered via a field or some bits (e.g. one bit). The information may be delivered via uplink resource selection, and the corresponding HARQ report is transmitted in the selected uplink resource. For instance, a first uplink resource may be for requesting additional or other sidelink resources with a need to satisfy the minimum time gap Z, and a second uplink resource may be for requesting additional or other sidelink resources without a need to satisfy the minimum time gap Z. The TX UE may select either the first uplink resource or the second uplink resource, based on the information.

In one embodiment, the TX UE may receive another SL grant, which schedules or assigns another multiple sidelink resources. Preferably, the another SL grant may schedule or assign the additional or other sidelink resources for retransmission of the TB. The another SL grant may indicate the same HARQ process ID as the SL grant, and/or the another SL grant may indicate non-toggled or the same NDI value as the SL grant.

In one embodiment, the TX UE may receive the another SL grant before the last sidelink resources scheduled or assigned by the SL grant (in time domain). The TX UE may take the another multiple sidelink resources into consideration when determining whether or which sidelink control information(s) indicates RX UE to transmit SL HARQ feedback or not.

In one embodiment, the minimum time gap may be (pre-)configured or specified. The minimum time gap may comprise a time gap 'a' and a time gap 'b'. The time gap 'a' may be a time gap between the end of the last symbol of the PSSCH transmission of the first resource and the start of the first symbol of the corresponding PSFCH reception. The time gap 'a' may be determined by resource pool configuration and/or higher layer parameters of MinTimeGapPSFCH and/or periodPSFCHresource. The time gap 'a' may be in unit of sidelink TTI. The time gap 'a' may be in unit of logical TTI. The time gap 'a' may be in unit of sidelink slot or sidelink symbol. The time gap 'a' may not be in unit of physical TTI or mini-second.

In one embodiment, the time gap 'b' may be a time required for PSFCH reception and/or processing plus sidelink retransmission preparation. The time for processing plus sidelink retransmission preparation may include any of multiplexing of necessary physical channels and/or any TX-RX or RX-TX switching time. The time gap 'b' may be determined by UE implementation. The time gap 'b' may be determined by UE capability. The time gap 'b' may be (pre-)configured or specified.

In one embodiment, the time gap 'b' may be in units of physical TTI mini-seconds, physical slots or physical symbols, logical TTIs or sidelink TTIs, or sidelink slots. The time gap 'b' may not be in units of physical TTIs or mini-seconds.

In one embodiment, the minimum time gap utilized in mode 1 may be the same as the minimum time gap utilized in mode 2. Additionally or alternatively, the minimum time gap utilized in mode 1 may be different from the minimum time gap utilized in mode 2.

In one embodiment, the multiple sidelink resources scheduled or assigned by the SL grant may be in the same sidelink resource pool. Any two sidelink resources of the multiple sidelink resources scheduled or assigned by the SL grant are in different slot. Any two sidelink resources of the multiple sidelink resources scheduled or assigned by the SL grant could have the same or different frequency resource allocation (e.g., occupying same or different location of sub-channels). Any two sidelink resources of the multiple sidelink resources scheduled or assigned by the SL grant could have the same number of sub-channels.

In one embodiment, the higher layer of the first device may mean MAC layer or RRC layer. The sidelink data transmission may be or may mean PSSCH. The sidelink control information may be delivered via PSCCH. The sidelink control information may mean 1'-stage sidelink control information or $2^{nd}$-stage sidelink control information. The sidelink control information comprises scheduling information of PSSCH transmission scheduled by the PSCCH.

In one embodiment, a (physical) TTI may comprise multiple symbols, e.g. 12 or 14 symbols. The sidelink TTI may be a slot (fully or partially) comprising sidelink symbols. The sidelink TTI may mean a transmission time interval for a sidelink (data) transmission.

In one embodiment, a sidelink slot may contain all OFDM symbols available for sidelink transmission in a (physical) TTI. A sidelink slot may contain a consecutive number symbols available for sidelink transmission in a (physical) TTI. The symbol may mean a symbol indicated/configured for sidelink.

In one embodiment, a sub-channel is a unit for sidelink resource allocation or scheduling (for PSSCH). A sub-channel may comprise multiple contagious PRBs in frequency domain. The number of PRBs for each sub-channel may be (pre-)configured for a sidelink resource pool. A sidelink resource pool (pre-)configuration may indicate or configure the number of PRBs for each sub-channel. The number of PRBs for each sub-channel may be any of 10, 15, 20, 25, 50, 75, or 100. A sub-channel may be represented as a unit for sidelink resource allocation or scheduling.

In one embodiment, the SL HARQ feedback may be delivered via PSFCH. For PSCCH and/or PSSCH transmitted from TX UE to RX UE, the RX UE may transmit PSFCH for delivering SL HARQ feedback in response of detecting or receiving PSCCH and/or PSSCH. The SL HARQ feedback may comprise ACK or NACK. The SL HARQ feedback for TB may be derived based on whether the RX UE successfully receives or decodes the data packet delivered in the associated PSSCH transmission. The SL HARQ feedback as DTX may mean the TX UE may not detect or receive the PSFCH transmission or may detect neither ACK nor NACK.

In one embodiment, the HARQ report to network node may be delivered via PUCCH or PUSCH. The TX UE may transmit PUCCH or PUSCH for delivering the HARQ report to network node. The PUCCH resource may be indicated by the SL grant. The time occasion of the PUCCH resource may be indicated by the SL grant.

In one embodiment, a TB may mean a sidelink data packet. A sidelink data packet may mean a MAC PDU. The Destination of the TB may be the RX UE. The Destination of the TB may be associated with unicast sidelink transmission. The Destination of the TB may be a sidelink group. The sidelink group may comprise the RX UE and/or the TX UE. The Destination of the TB may be associated with groupcast sidelink transmission. The Destination of the TB may be surrounding UE(s). The surrounding UE may comprise the RX UE. The Destination of the TB may be associated with broadcast sidelink transmission.

In one embodiment, the sidelink transmission or reception may be device-to-device transmission or reception. The sidelink transmission or reception may be V2X (e.g. V2V or V2P or V2I) transmission or reception. The sidelink transmission or reception may be P2X (e.g. P2V or P2P or P2I) transmission or reception. The sidelink transmission or reception may be on PC5 interface.

In one embodiment, the PC5 interface may be wireless interface for communication between device and device. The PC5 interface may be wireless interface for communication between devices. The PC5 interface may be wireless interface for communication between UEs. The PC5 interface may be wireless interface for V2X or P2X communication. The Uu interface may be wireless interface for communication between network node and device. The Uu interface may be wireless interface for communication between network node and UE.

In one embodiment, the network node may be a gNB. The network node may be a base station. The network node may be a RSU. The network node may be a network-type RSU. The network node may be a UE-type RSU. The network node may be replaced or represented by a specific device within a sidelink group. The network node may be a scheduling device or leader device within a sidelink group. The network node may be replaced or represented by a relay device or a relay UE.

In one embodiment, the TX UE and the RX UE may be different UEs. The TX UE may be a device. In particular, the TX UE may be a vehicle UE, a pedestrian UE, or a V2X UE. The TX UE may also be a transmitting device, a network-type RSU, or a UE-type RSU. IN one embodiment, the TX UE may be a specific device within a sidelink group. The TX UE may be a scheduling device or leader device within a sidelink group. The TX UE may be a relay device, or a remote device.

In one embodiment, the RX UE may be a device. In particular, the RX UE may be a vehicle UE, a pedestrian UE, or a V2X UE. The RX UE may be a transmitting device, a network-type RSU, or a UE-type RSU. In one embodiment, the RX UE may be a specific device within a sidelink group. The RX UE may be a scheduling device or leader device within a sidelink group. The RX UE may be a relay device, or a remote device.

In one embodiment, the HARQ report could be a semi-static or dynamic HARQ codebook. The HARQ report could be type-1 or type-2 HARQ codebook. The semi-static HARQ codebook comprising locations associated to a set of timing (e.g., k1 timing between slot containing PSFCH and slot containing PUCCH for delivering the HARQ report) and number of PSSCH slot associated to a PSFCH slot. The dynamic HARQ codebook comprising locations associated to a set of timing (e.g., k1 timing between slot containing PSFCH and slot containing PUCCH for delivering the HARQ report), number of PSSCH slot associated to a PSFCH slot, and/or monitoring occasion(s) for SL grant.

Figure 10:
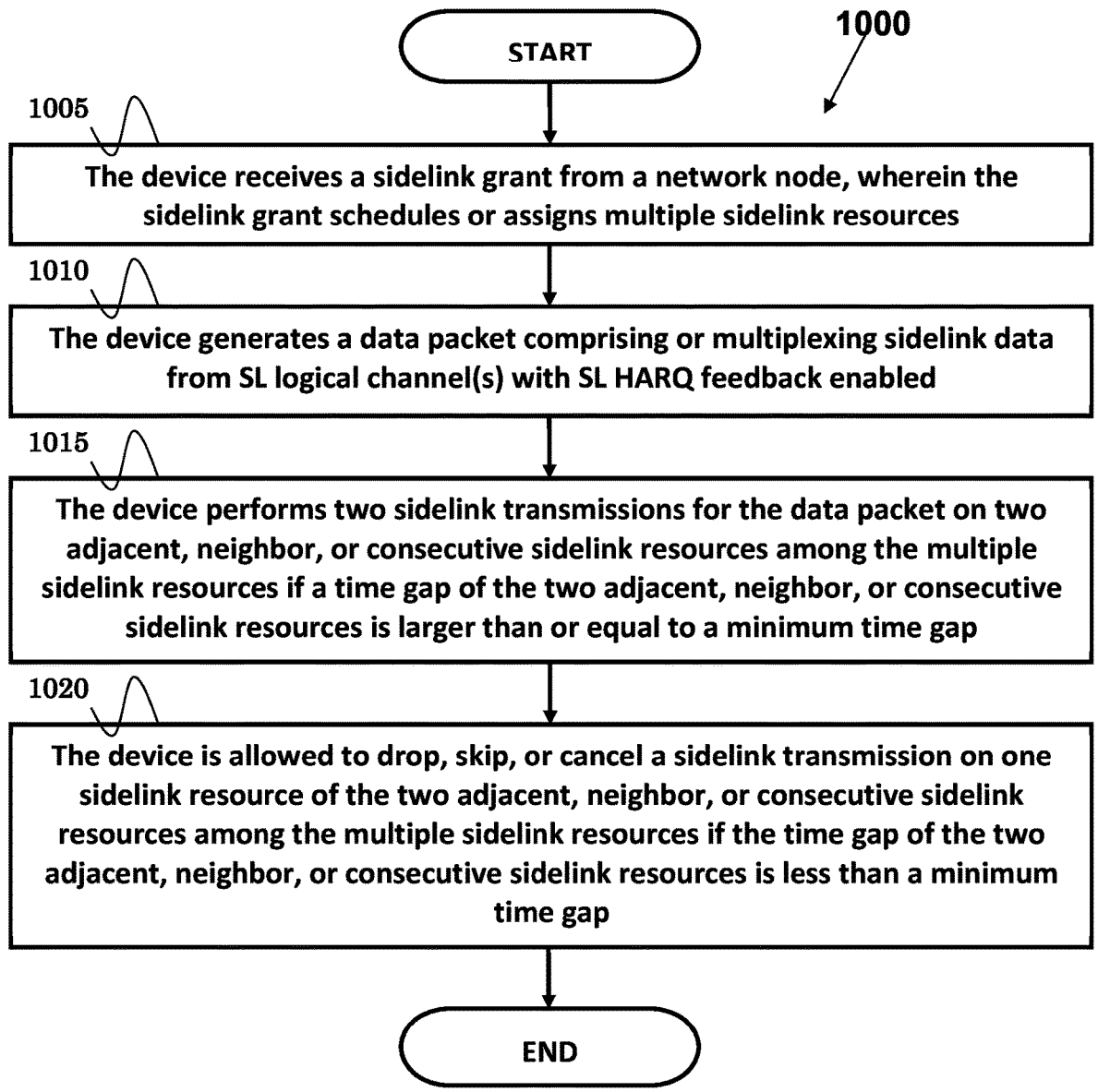
FIG. 10 is a flow chart according to one exemplary embodiment.

FIG. 10 is a flow chart 1000 according to one exemplary embodiment from the perspective of a device to perform sidelink communication. In step 1005, the device receives a sidelink grant from a network node, wherein the sidelink grant schedules or assigns multiple sidelink resources. In step 1010, the device generates a data packet comprising or multiplexing sidelink data from SL logical channel(s) with SL HARQ feedback enabled. In step 1015, the device performs two sidelink transmissions for the data packet on two adjacent, neighbor, or consecutive sidelink resources among the multiple sidelink resources if a time gap of the two adjacent, neighbor, or consecutive sidelink resources is larger than or equal to a minimum time gap. In step 1020, the device is allowed to drop, skip, or cancel a sidelink transmission on one sidelink resource of the two adjacent, neighbor, or consecutive sidelink resources among the multiple sidelink resources if the time gap of the two adjacent, neighbor, or consecutive sidelink resources is less than a minimum time gap.

In one embodiment, the device could perform one or more sidelink transmission(s) for the data packet on the multiple sidelink resources, excluding the one sidelink resource if the time gap of the two adjacent, neighbor, or consecutive sidelink resources is less than a minimum time gap. In one embodiment, the device could perform sidelink transmission for the data packet on each of the multiple sidelink resources, excluding the one sidelink resource if the time gap of the two adjacent, neighbor, or consecutive sidelink resources is less than a minimum time gap.

In one embodiment, the device is allowed to drop, skip, or cancel the sidelink transmission on the one sidelink resource could mean or comprise that the device determines to perform or to drop, skip or cancel the sidelink transmission on the one sidelink resource if the time gap of the two adjacent, neighbor, or consecutive sidelink resources is less than a minimum time gap. Furthermore, the device is allowed to drop, skip, or cancel the sidelink transmission on the one sidelink resource could mean or comprise that the device determines whether to drop, skip, or cancel the sidelink transmission on the one sidelink resource if the time gap of the two adjacent, neighbor, or consecutive sidelink resources is less than a minimum time gap.

In one embodiment, the one sidelink resource could be the first one or the earlier one of the two adjacent, neighbor, or consecutive sidelink resources. The one sidelink resource could be the last one or the latter one of the two adjacent, neighbor, or consecutive sidelink resources.

In one embodiment, the device drops, skips, or cancels the sidelink transmission on one sidelink resource could mean or comprise that the device does not perform the sidelink transmission on the one sidelink resource.

In one embodiment, when the device generates the data packet, the device may not consider or check time gap of any two adjacent, neighbor, or consecutive sidelink resources among the multiple sidelink resources being larger or less than a minimum time gap. Furthermore, when the device determines or selects logical channel(s) for generating the data packet, the device may not consider or check time gap of any two adjacent, neighbor, or consecutive sidelink resources among the multiple sidelink resources being larger or less than a minimum time gap.

In one embodiment, the minimum time gap may comprise a first time gap and a second time gap. Furthermore, the first time gap is between end of the last symbol of a Physical Sidelink Shared Channel (PSSCH) transmission and start of the first symbol of corresponding Physical Sidelink Feedback Channel (PSFCH) reception. In addition, the second time gap comprises a time required for PSFCH reception and/or processing plus sidelink retransmission preparation.

Referring back to FIGS. 3 and 4, in one exemplary embodiment of a communication device to perform sidelink communication. The communication device 300 includes a program code 312 stored in the memory 310. The CPU 308 could execute program code 312 to enable the communication device (i) to receive a sidelink grant from a network node, wherein the sidelink grant schedules or assigns multiple sidelink resources, (ii) to generate a data packet comprising or multiplexing sidelink data from SL logical channel(s) with SL HARQ feedback enabled, (iii) to perform two sidelink transmissions for the data packet on two adjacent, neighbor, or consecutive sidelink resources among the multiple sidelink resources if a time gap of the two adjacent, neighbor, or consecutive sidelink resources is larger than or equal to a minimum time gap, and (iv) to allow (the communication device) to drop, skip, or cancel a sidelink transmission on one sidelink resource of the two adjacent, neighbor, or consecutive sidelink resources among the multiple sidelink resources if the time gap of the two adjacent, neighbor, or consecutive sidelink resources is less than a minimum time gap. Furthermore, the CPU 308 can execute the program code 312 to perform all of the above-described actions and steps or others described herein.

Figure 11:
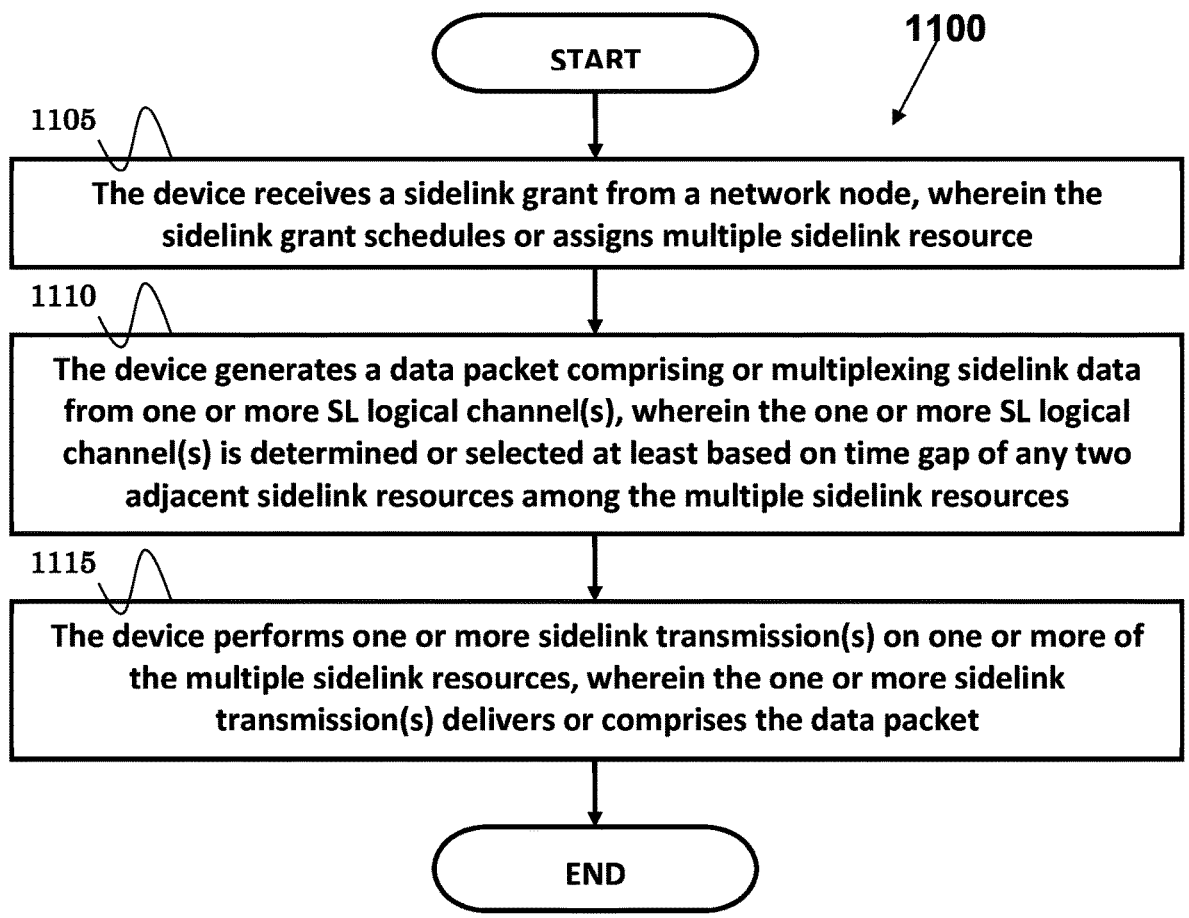
FIG. 11 is a flow chart according to one exemplary embodiment.

FIG. 11 is a flow chart 1100 according to one exemplary embodiment from the perspective of a device to perform sidelink communication. In step 1105, the device receives a sidelink grant from a network node, wherein the sidelink grant schedules or assigns multiple sidelink resources. In step 1110, the device generates a data packet comprising or multiplexing sidelink data from one or more SL logical channel(s), wherein the one or more SL logical channel(s) is determined or selected at least based on time gap of any two adjacent sidelink resources among the multiple sidelink resources. In step 1115, the device performs one or more sidelink transmission(s) on one or more of the multiple sidelink resources, wherein the one or more sidelink transmission(s) delivers or comprises the data packet.

In one embodiment, when (at least) a time gap of any two adjacent, neighbor, or consecutive sidelink resources among the multiple sidelink resources is less than a minimum time gap, the device could determine to select (only) SL logical channel(s) with SL HARQ feedback disabled. Furthermore, when (all) the time gap of any two adjacent, neighbor, or consecutive sidelink resources among the multiple sidelink resources is larger than or equal to a minimum time gap, the device could be allowed to select SL logical channel(s) with SL HARQ feedback enabled.

In one embodiment, the minimum time gap may comprise a first time gap and a second time gap. The first time gap may be between end of the last symbol of a PSSCH transmission and start of the first symbol of corresponding PSFCH reception. The second time gap may comprise a time required for PSFCH reception and/or processing plus sidelink retransmission preparation.

Referring back to FIGS. 3 and 4, in one exemplary embodiment of a communication device to perform sidelink communication. The communication device 300 includes a program code 312 stored in the memory 310. The CPU 308 could execute program code 312 to enable the communication device (i) to receive a sidelink grant from a network node, wherein the sidelink grant schedules or assigns multiple sidelink resource, (ii) to generate a data packet comprising or multiplexing sidelink data from one or more SL logical channel(s), wherein the one or more SL logical channel(s) is determined or selected at least based on time gap of any two adjacent sidelink resources among the multiple sidelink resources, and (iii) to perform one or more sidelink transmission(s) on one or more of the multiple sidelink resources, wherein the one or more sidelink transmission(s) delivers or comprises the data packet. Furthermore, the CPU 308 can execute the program code 312 to perform all of the above-described actions and steps or others described herein.

Various aspects of the disclosure have been described above. It should be apparent that the teachings herein may be embodied in a wide variety of forms and that any specific structure, function, or both being disclosed herein is merely representative. Based on the teachings herein one skilled in the art should appreciate that an aspect disclosed herein may be implemented independently of any other aspects and that two or more of these aspects may be combined in various ways. For example, an apparatus may be implemented or a method may be practiced using any number of the aspects set forth herein. In addition, such an apparatus may be implemented or such a method may be practiced using other structure, functionality, or structure and functionality in addition to or other than one or more of the aspects set forth herein. As an example of some of the above concepts, in some aspects concurrent channels may be established based on pulse repetition frequencies. In some aspects concurrent channels may be established based on pulse position or offsets. In some aspects concurrent channels may be established based on time hopping sequences. In some aspects concurrent channels may be established based on pulse repetition frequencies, pulse positions or offsets, and time hopping sequences.

Those of skill in the art would understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Those of skill would further appreciate that the various illustrative logical blocks, modules, processors, means, circuits, and algorithm steps described in connection with the aspects disclosed herein may be implemented as electronic hardware (e.g., a digital implementation, an analog implementation, or a combination of the two, which may be designed using source coding or some other technique), various forms of program or design code incorporating instructions (which may be referred to herein, for convenience, as "software" or a "software module"), or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure.

In addition, the various illustrative logical blocks, modules, and circuits described in connection with the aspects disclosed herein may be implemented within or performed by an integrated circuit ("IC"), an access terminal, or an access point. The IC may comprise a general purpose processor, a digital signal processor (DSP), an application specific integrated circuit (ASIC), a field programmable gate array (FPGA) or other programmable logic device, discrete gate or transistor logic, discrete hardware components, electrical components, optical components, mechanical components, or any combination thereof designed to perform the functions described herein, and may execute codes or instructions that reside within the IC, outside of the IC, or both. A general purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

It is understood that any specific order or hierarchy of steps in any disclosed process is an example of a sample approach. Based upon design preferences, it is understood that the specific order or hierarchy of steps in the processes may be rearranged while remaining within the scope of the present disclosure. The accompanying method claims present elements of the various steps in a sample order, and are not meant to be limited to the specific order or hierarchy presented.

The steps of a method or algorithm described in connection with the aspects disclosed herein may be embodied directly in hardware, in a software module executed by a processor, or in a combination of the two. A software module (e.g., including executable instructions and related data) and other data may reside in a data memory such as RAM memory, flash memory, ROM memory, EPROM memory, EEPROM memory, registers, a hard disk, a removable disk, a CD-ROM, or any other form of computer-readable storage medium known in the art. A sample storage medium may be coupled to a machine such as, for example, a computer/processor (which may be referred to herein, for convenience, as a "processor") such the processor can read information (e.g., code) from and write information to the storage medium. A sample storage medium may be integral to the processor. The processor and the storage medium may reside in an ASIC. The ASIC may reside in user equipment. In the alternative, the processor and the storage medium may reside as discrete components in user equipment. Moreover, in some aspects any suitable computer-program product may comprise a computer-readable medium comprising codes relating to one or more of the aspects of the disclosure. In some aspects a computer program product may comprise packaging materials.

While the invention has been described in connection with various aspects, it will be understood that the invention is capable of further modifications. This application is intended to cover any variations, uses or adaptation of the invention following, in general, the principles of the invention, and including such departures from the present disclosure as come within the known and customary practice within the art to which the invention pertains.

What is claimed is:

1. A method of a device to perform sidelink communication, comprising:
   the device receives a sidelink grant from a network node, wherein the sidelink grant schedules or assigns multiple sidelink resources;
   the device generates a data packet comprising or multiplexing sidelink data from Sidelink (SL) logical channel(s) with SL Hybrid Automatic Request (HARQ) feedback enabled;
   the device performs two sidelink transmissions for the data packet on two adjacent or consecutive sidelink resources among the multiple sidelink resources when a time gap of the two adjacent or consecutive sidelink resources is larger than or equal to a minimum time gap; and
   the device determines to drop, skip, or cancel a sidelink transmission on one sidelink resource of the two adjacent or consecutive sidelink resources among the multiple sidelink resources when the time gap of the two adjacent or consecutive sidelink resources is less than the minimum time gap.

2. The method of claim 1, wherein the device performs one or more sidelink transmissions for the data packet on the multiple sidelink resources, excluding the one sidelink resource when the time gap of the two adjacent or consecutive sidelink resources is less than the minimum time gap.

3. The method of claim 1, wherein the device determines to drop, skip, or cancel the sidelink transmission on the one sidelink resource means or comprises that the device always drops, skips, or cancels the sidelink transmission on the one sidelink resource when the time gap of the two adjacent or consecutive sidelink resources is less than the minimum time gap.

4. The method of claim 1, wherein the one sidelink resource is an earlier one of the two adjacent or consecutive sidelink resources.

5. The method of claim 1, wherein the one sidelink resource is a latter one of the two adjacent or consecutive sidelink resources.

6. The method of claim 1, wherein the device drops, skips, or cancels the sidelink transmission on one sidelink resource means or comprises that the device does not perform the sidelink transmission on the one sidelink resource.

7. The method of claim 1, further comprising:
   when the device generates the data packet, the device does not consider or check time gap of any two adjacent or consecutive sidelink resources among the multiple sidelink resources being larger or less than the minimum time gap, and/or
   when the device determines or selects logical channel(s) for generating the data packet, the device does not consider or check time gap of any two adjacent or consecutive sidelink resources among the multiple sidelink resources being larger or less than the minimum time gap.

8. The method of claim 1, wherein the minimum time gap comprises a first time gap and a second time gap,
   wherein the first time gap is between end of a last symbol of a Physical Sidelink Shared Channel (PSSCH) transmission and start of a first symbol of corresponding Physical Sidelink Feedback Channel (PSFCH) reception, and
   wherein the second time gap comprises a time required for PSFCH reception and/or processing plus sidelink retransmission preparation, or the second time gap is (pre)-configured or a specified value.

9. A method of a device to perform sidelink communication, comprising:
   the device receives a sidelink grant from a network node, wherein the sidelink grant schedules or assigns multiple sidelink resources, and the multiple sidelink resources comprise two or more sidelink resources;
   the device generates a data packet comprising or multiplexing sidelink data from one or more Sidelink (SL) logical channels, wherein the one or more SL logical channels is determined or selected at least based on time gap(s) of any two adjacent sidelink resources among the multiple sidelink resources and associated minimum time gap; and
   the device performs one or more sidelink transmissions on one or more of the multiple sidelink resources, wherein the one or more sidelink transmissions delivers or comprises the data packet.

10. The method of claim 9, further comprising:
    when at least a time gap of any two adjacent or consecutive sidelink resources among the multiple sidelink resources is less than the minimum time gap, the device determines to select (only) SL logical channel(s) with SL Hybrid Automatic Request (HARQ) feedback disabled.

11. The method of claim 9, further comprising:
when (all) time gap(s) of any two adjacent or consecutive sidelink resources among the multiple sidelink resources is larger than or equal to the minimum time gap, the device is allowed to select SL logical channel(s) with SL HARQ feedback enabled.

12. The method of claim 9, wherein the minimum time gap comprises a first time gap and a second time gap,
wherein the first time gap is between end of a last symbol of a Physical Sidelink Shared Channel (PSSCH) transmission and start of a first symbol of corresponding Physical Sidelink Feedback Channel (PSFCH) reception, and
wherein the second time gap comprises a time required for PSFCH reception and/or processing plus sidelink retransmission preparation, or the second time gap is (pre)-configured or a specified value.

13. A communication device, comprising:
a control circuit;
a processor installed in the control circuit; and
a memory installed in the control circuit and operatively coupled to the processor;
wherein the processor is configured to execute a program code stored in the memory to:
receive a sidelink grant from a network node, wherein the sidelink grant schedules or assigns multiple sidelink resources;
generate a data packet comprising or multiplexing sidelink data from Sidelink (SL) logical channel(s) with SL Hybrid Automatic Request (HARQ) feedback enabled;
perform two sidelink transmissions for the data packet on two adjacent or consecutive sidelink resources among the multiple sidelink resources when a time gap of the two adjacent or consecutive sidelink resources is larger than or equal to a minimum time gap; and
determine to drop, skip, or cancel a sidelink transmission on one sidelink resource of the two adjacent or consecutive sidelink resources among the multiple sidelink resources when the time gap of the two adjacent or consecutive sidelink resources is less than the minimum time gap.

14. The communication device of claim 13, wherein the processor is configured to execute a program code stored in the memory to:
perform one or more sidelink transmission(s) for the data packet on the multiple sidelink resources, excluding the one sidelink resource when the time gap of the two adjacent or consecutive sidelink resources is less than the minimum time gap.

15. The communication device of claim 13, wherein the one sidelink resource is an earlier one of the two adjacent or consecutive sidelink resources, or
wherein the one sidelink resource is a latter one of the two adjacent or consecutive sidelink resources.

16. The communication device of claim 13, wherein the device drops, skips, or cancels the sidelink transmission on one sidelink resource means or comprises that the device does not perform the sidelink transmission on the one sidelink resource.

17. The communication device of claim 13, wherein the processor is configured to execute a program code stored in the memory to:
not consider or check time gap of any two adjacent or consecutive sidelink resources among the multiple sidelink resources being larger or less than the minimum time gap when the communication device generates the data packet, and/or
not consider or check time gap of any two adjacent or consecutive sidelink resources among the multiple sidelink resources being larger or less than the minimum time gap when the not consider or check time gap of any two adjacent or consecutive sidelink resources among the multiple sidelink resources being larger or less than the minimum time gap when the communication device determines or selects logical channel(s) for generating the data packet.

18. The communication device of claim 13, wherein the minimum time gap comprises a first time gap and a second time gap,
wherein the first time gap is between end of a last symbol of a Physical Sidelink Shared Channel (PSSCH) transmission and start of a first symbol of corresponding Physical Sidelink Feedback Channel (PSFCH) reception, and
wherein the second time gap comprises a time required for PSFCH reception and/or processing plus sidelink retransmission preparation, or the second time gap is (pre)-configured or a specified value.

* * * * *